US009515868B2

(12) United States Patent
Ashida et al.

(10) Patent No.: US 9,515,868 B2
(45) Date of Patent: Dec. 6, 2016

(54) SYSTEM AND METHOD FOR COMMUNICATION

(71) Applicant: NEC CORPORATION, Minato-ku, Tokyo (JP)

(72) Inventors: Yuta Ashida, Tokyo (JP); Toshio Koide, Tokyo (JP)

(73) Assignee: NEC Corporation, Tokyo (JP)

( * ) Notice: Subject to any disclaimer, the term of this patent is extended or adjusted under 35 U.S.C. 154(b) by 108 days.

(21) Appl. No.: 14/387,319

(22) PCT Filed: Mar. 21, 2013

(86) PCT No.: PCT/JP2013/001913
§ 371 (c)(1),
(2) Date: Sep. 23, 2014

(87) PCT Pub. No.: WO2013/140803
PCT Pub. Date: Sep. 26, 2013

(65) Prior Publication Data
US 2015/0055508 A1    Feb. 26, 2015

(30) Foreign Application Priority Data

Mar. 23, 2012    (JP) .................................. 2012-068286

(51) Int. Cl.
*H04L 12/24* (2006.01)
*H04L 12/701* (2013.01)

(52) U.S. Cl.
CPC ............... *H04L 41/04* (2013.01); *H04L 45/00* (2013.01); *H04L 41/12* (2013.01)

(58) Field of Classification Search
CPC ........... H04L 41/04; H04L 41/12; H04L 45/00
See application file for complete search history.

(56) References Cited

U.S. PATENT DOCUMENTS

2011/0317701 A1    12/2011    Yamato et al.
2012/0294617 A1    11/2012    Miyamura et al.
(Continued)

FOREIGN PATENT DOCUMENTS

| JP | 2011-155508 A | 8/2011 |
| JP | 2012-039188 A | 2/2012 |
| JP | 2012-049674 A | 3/2012 |

OTHER PUBLICATIONS

Extended European Search Report dated Oct. 19, 2015.
(Continued)

*Primary Examiner* — Albert T Chou
(74) *Attorney, Agent, or Firm* — Finnegan, Henderson, Farabow, Garrett & Dunner LLP

(57) ABSTRACT

A communications system includes: a first node device provided in a first network; a first controller controlling the first node device; a second node device provided in a second network and connected to the first node device; and a second controller controlling the second node device. The first controller sets the first node device with a processing rule according to which packets transferred between the first and second controllers are processed. The second controller sets the second node device with a processing rule according to which the packets are processed. The first and second controllers exchanges the packets each other through at least the first and second node devices.

28 Claims, 16 Drawing Sheets

(56) References Cited

U.S. PATENT DOCUMENTS

| | | | | |
|---|---|---|---|---|
| 2012/0300615 | A1* | 11/2012 | Kempf | H04W 24/02 370/216 |
| 2013/0010600 | A1* | 1/2013 | Jocha | H04L 43/026 370/236.2 |
| 2013/0024579 | A1* | 1/2013 | Zhang | H04W 16/18 709/230 |
| 2014/0241247 | A1* | 8/2014 | Kempf | H04L 12/4633 370/328 |
| 2015/0139245 | A1* | 5/2015 | Yedavalli | H04L 41/12 370/401 |

OTHER PUBLICATIONS

Vujosevic et al., "Investigation and Validation of the OpenFlow Protocol for Next Generation Converged Optical Networks", Jul. 1, 2011, p. 1-90 XP055142138, Internet Article, Retrieved from the Internet: URL:https://upcommons.upc.edujpfG/bitstream/2099.1/12760/1/Master_Thesis_Report.pdf [retrieved on Sep. 23, 2014].

English Translation of International Preliminary Report on Patentability in PCT Application No. PCT/JP2013/001913 dated Sep. 23, 2014.

International Search Report in PCT/JP2013/001913 dated Mar. 21, 2013 (English Translation Thereof).

Nick Mckeown and Other Seven Persons, "OpenFlow: Enabling Innovation in Campus Networks", online, Retrieval on Jan. 23, 2012, Internet (URL: http://www.openflow.Org/documents/openflow-wp-latest.pdf).

"OpenFlow Switch Specification, Version 1.1.0 Implemented", online, Retrieval on Feb. 28, 2012, Internet (URL:http//ww.openflowswitch.org/documents/opedflow-spec-v1.1.0.pdf).

T. Koide, "A study on the automatic construction mechanism of control network in OpenFlow-based network", IEICE Technical Report, Feb. 25, 2010, vol. 109, No. 448, p. 19-24.

* cited by examiner

Fig. 6A

NETWORK 1

| | | IDENTIFYING CONDITIONS | | | CONTENTS OF PROCESSING |
|---|---|---|---|---|---|
| | | SOURCE MAC ADDRESS | DESTINATION MAC ADDRESS | eth_type | ACTION |
| PROCESSING RULE IN NODE 20-1 | (1) | CONTROLLER 10-2 | CONTROLLER 10-1 | 0x8800 | output to CONTROLLER 10-1 |
| | (2) | CONTROLLER 10-1 | CONTROLLER 10-2 | 0x8800 | output to NODE DEVICE 20-2 |
| PROCESSING RULE IN NODE 20-2 | (3) | CONTROLLER 10-2 | CONTROLLER 10-1 | 0x8800 | output to NODE DEVICE 20-1 |
| | (4) | CONTROLLER 10-1 | CONTROLLER 10-2 | 0x8800 | output to NODE DEVICE 20-3 |
| PROCESSING RULE IN NODE 20-3 | (5) | CONTROLLER 10-2 | CONTROLLER 10-1 | 0x8800 | output to NODE DEVICE 20-2 |
| | (6) | CONTROLLER 10-1 | CONTROLLER 10-2 | 0x8800 | output to NODE DEVICE 20-4 |

Fig. 6B

NETWORK 2

| | | IDENTIFYING CONDITIONS | | CONTENTS OF PROCESSING |
|---|---|---|---|---|
| | SOURCE MAC ADDRESS | DESTINATION MAC ADDRESS | eth_type | ACTION |
| (1) | CONTROLLER 10-2 | CONTROLLER 10-1 | 0x8800 | output to NODE DEVICE 20-3 |
| (2) | CONTROLLER 10-1 | CONTROLLER 10-2 | 0x8800 | output to NODE DEVICE 20-5 |
| (3) | CONTROLLER 10-2 | CONTROLLER 10-1 | 0x8800 | output to NODE DEVICE 20-4 |
| (4) | CONTROLLER 10-1 | CONTROLLER 10-2 | 0x8800 | output to NODE DEVICE 20-6 |
| (5) | CONTROLLER 10-2 | CONTROLLER 10-1 | 0x8800 | output to NODE DEVICE 20-5 |
| (6) | CONTROLLER 10-1 | CONTROLLER 10-2 | 0x8800 | output to CONTROLLER 10-2 |

PROCESSING RULE IN NODE 20-4: (1), (2)
PROCESSING RULE IN NODE 20-5: (3), (4)
PROCESSING RULE IN NODE 20-6: (5), (6)

Fig. 9A

| VIRTUAL PORT ID | NODE DEVICE ID | INTERFACE ID | OWN ADDRESS | COUNTERPART ADDRESS | PROCESSING RULE ID |
|---|---|---|---|---|---|
| VP1 | DPID3 | IF3 | CONTROLLER 10-1 | CONTROLLER 10-2 | A |
| ... | ... | ... | ... | ... | ... |

SORTING RULE IN CONTROLLER 10-1

Fig. 9B

| VIRTUAL PORT ID | NODE DEVICE ID | INTERFACE ID | OWN ADDRESS | COUNTERPART ADDRESS | PROCESSING RULE ID |
|---|---|---|---|---|---|
| VP2 | DPID4 | IF4 | CONTROLLER 10-2 | CONTROLLER 10-1 | B |
| ... | ... | ... | ... | ... | ... |

SORTING RULE IN CONTROLLER 10-2

Fig. 11A

| VIRTUAL PORT ID | NODE DEVICE ID | INTERFACE ID | OWN ADDRESS | COUNTERPART ADDRESS | PROCESSING RULE ID |
|---|---|---|---|---|---|
| VP11 | DPID3 | IF32 | AD11 | AD21 | A1 |
| VP12 | DPID1 | IF11 | AD12 | AD22 | A2 |
| ... | ... | ... | ... | ... | ... |

Fig. 11B

| VIRTUAL PORT ID | NODE DEVICE ID | INTERFACE ID | OWN ADDRESS | COUNTERPART ADDRESS | PROCESSING RULE ID |
|---|---|---|---|---|---|
| VP21 | DPID4 | IF41 | AD21 | AD11 | B1 |
| VP22 | DPID6 | IF62 | AD22 | AD12 | B2 |
| ... | ... | ... | ... | ... | ... |

SYSTEM AND METHOD FOR COMMUNICATION

TECHNICAL FIELD

The present invention relates to a communications system and more particularly relates to a communications system managed by a centralized management, in which controllers control packet transfers among network devices.

BACKGROUND ART

One problem of conventional network devices is that flexible load control, such as load distribution and load concentration, cannot be achieved by an external control. This makes it difficult to monitor and improve the system behavior in a large-scale network, causing a problem that a modification in the system design and/or configuration requires a large cost.

One proposed approach for solving this problem is separation of the packet transfer function and the route control function which are both conventionally implemented by a network device. For example, in a system in which the packet transfer function is assigned to network devices and the control function is assigned to a controller provided separately from the network devices, the controller can perform centralized management of packet transfer, which allows establishing a network with high flexibility.

(CD-Separated Network)

One proposed function-separated network is a CD-separated network (where C stands for control plane and d stands for data plane), in which a controller operating on the control plane controls node devices operating on the data plane.

One example of the CD-separated network is an Open-Flow network which is based on the OpenFlow technique, in which the route control in the network is achieved by controlling switches by a controller. Details of the Open-Flow technique are disclosed in non-patent documents 1 and 2. Note that the OpenFlow network should be construed as one example.

(OpenFlow Network)

In an OpenFlow network, a controller, such as an Open-Flow controller (OFC), controls the behavior of node devices, such as OpenFlow switches (OFSs), by processing route control information (or a flow table) which describes the route control of the node devices.

Controllers and node devices are connected via control channels (communication channels for control) called "secure channels", which are communication paths protected by using dedicated lines or an SSL (Secure Socket Layer) technique. Controllers and node devices exchange OpenFlow messages defined in the OpenFlow protocol via control channels.

In the OpenFlow network, each node device is provided in the OpenFlow network and controlled by the controller; each node device may be an edge switch or a core switch. A series of packet transfers from the receipt of a packet at an ingress edge switch to the transmission at an egress edge switch in the OpenFlow network is referred to as "flow". In the OpenFlow network, communications are each regarded as an end-to-end flow, and the route control, the trouble recovery, and the load distribution and optimization are carried out in units of flows.

It should be noted that the frame should be regard as an alternative of the packet. The difference between the packet and the frame only lies in the difference in the protocol data unit (PDU). The packet is the PDU of the TCP/IP (transmission control protocol/internet protocol). On the other hand, the frame is the PDU of the "Ethernet" (registered trademark).

The route control information (or the flow table) includes a set of: identifying conditions (identifying rules) to identify packets to be treated as a flow; statistical information that indicates the number of times in which packets comply or match with the identifying conditions (or the identifying rules); and processing rules (or flow entries) which define a group of contents of processing (or actions) to be performed on packets.

The identifying conditions (or the identifying rules) of each processing rule (or each flow entry) are defined by various combinations of any or all of data of respective protocol hierarchies included in the header region (or the header field) of the packet, and distinguishable one another by using these data. One example of data of the respective protocol hierarchies may include the destination address, the source address, the destination port, the source port. Note that the above-described addresses may be defined by a MAC (media access control) address or an IP address. Also, data of the ingress port may be also used as the identifying conditions (or the identifying rules) of the processing rules (or the flow entries). Furthermore, the identifying conditions (or the identifying rules) of the processing rules (or the flow entries) may be set in the form of a representation in which some or all of the values of the header region of the packet to be treated as the flow are represented by using a normal representation, a wildcard character "*" or the like.

The contents of processing (or the action) of a processing rule (or a flow entry) indicates an operations such as "output to a particular port", "discarding" and "rewriting of header". For example, if the contents of processing (or the action) of a processing rule (or a flow entry) indicates identification information of an output port (an output port number and the like), the node device outputs the packet to the indicated port, and if not, the node device discards the packet. Instead, if the contents of processing (or the action) of the processing rule (or the flow entry) indicates the header information, the node device rewrites the header of the packet on the basis of the header information.

A node device in the OpenFlow network performs the contents of processing (or the action) of a processing rule (or a flow entry) on a group of packets (or a series of packets) that complies with the identifying conditions (or the identifying rules) of the processing rule (or the flow entry).

For example, when receiving a packet, an OpenFlow switch (OFS), which corresponds to a node device in the OpenFlow network, retrieves the processing rule (or the flow entry) associated with the identifying conditions (or the identifying rule) complying with the header information of the received packet from the route control information (of the flow table). If the processing rule (flow entry) complying with the receipt packet is found out as a result of the retrieval, the contents of processing (or the action) described in the action field of the processing rule (or the flow entry) is performed on the received packet. If no processing rule (or the flow entry) complying with the received packet is found as a result of the retrieval, on the other hand, the received packet is judged as the first packet. In this case, inquiry information of the received packet is transmitted to an OpenFlow controller (OFC), which corresponds to the controller in the OpenFlow network, via a control channel to request for determining the route of the packet based on the source and destination of the received packet; this is followed by receiving a processing rule (or a flow entry) for attaining the packet transfer along the determined route and then updating the route control information (or the flow table).

It should be noted that an initial state processing rule (or a default entry) is registered in the route control information (or the flow table), where the initial state processing rule describes identifying conditions (or identifying rules) of a low priority which are defined so as to comply with the header information of any packets. If no other processing rule (or flow entry) complying with the received packet is found, the received packet complies with the initial state processing rule (or the default entry). The contents of processing (or the action) of the initial state processing rule (or the default entry) is defined to instruct to transmit inquiry information of the received packet to the OpenFlow controller (OFC).

As mentioned above, the OpenFlow switch (OFS) determines processing to be done on a packet in accordance with the setting of processing rules (or flow entries) set by the OpenFlow controller (OFC). In particular, the "output" processing, in which a packet is outputted to a specified interface, is often used as the processing. It should be noted that the specified interface is not limited to a physical interface; the specified interface is not limited to the physical port and may be a virtual port.

As thus described, control of packets is attained by centralized control of OpenFlow switches (OFS) by an OpenFlow controller (OFC) in the OpenFlow network. One issue is that one OpenFlow controller (OFC) can control only a limited number of OpenFlow switches (OFS). Accordingly, an increase in the scale of the network, which causes an increase in the number of the OpenFlow switches (OFS), may result in that calculation of processing rules (flow entries) in the OpenFlow controller (OFC) and the like becomes a bottleneck of the network quality.

One approach to address this may be connecting a plurality of OpenFlow networks, each including one Openflow controller (OFC) and a plurality of OpenFlow switches (OFS) controlled by the OpenFlow controller, when the scale of the network is increased.

CITATION LIST

Non Patent Literature

[NPL 1] Nick Mckeown and Other Seven Persons, "OpenFlow: Enabling Innovation in Campus Networks", online, Retrieval on Jan. 23, 2012, Internet (URL: http://www.openflow.Org/documents/openflow-wp-latest.pdf)

[NPL 2] "OpenFlow Switch Specification, Version 1.1.0 Implemented", online, Retrieval on Feb. 28, 2012, Internet (URL:http//ww.openflowswitch.org/documents/openflow-spec-v1.1.0.pdf)

SUMMARY OF INVENTION

An interconnection of a plurality of networks each managed by a centralized management, such as OpenFlow networks, requires exchanging and sharing of information related to route control among the controllers to control the traffic over the networks. One approach to achieve this may be using an existing routing protocol, such as the OSPF (open shortest path first) protocol and the BGP (border gateway protocol) or other data sharing protocols in order to exchange and share information related to the route control among the controllers.

The use of these protocols to exchange information related to the route control among the controllers, however, requires establishing a connection between adjacent controllers.

In an aspect of the present invention, a communications system includes: a first node device provided in a first network; a first controller controlling the first node device; a second node device provided in a second network and connected to the first node device; and a second controller controlling the second node device. The first controller sets the first node device with a processing rule according to which packets transferred between the first and second controllers are processed. The second controller sets the second node device with a processing rule according to which the packets are processed. The first and second controllers exchanges the packets each other through at least the first and second node devices.

In another aspect of the present invention, a communication method includes:

setting a first node device provided in a first network by a first controller controlling the first node device with a processing rule according to which packets transferred between the first controller and a second controller controlling a second node provided in a second network are processed;

setting the second node device by the second controller with a processing rule according to which the packets are processed;

establishing a connection between the first and second node devices; and exchanging the packets between the first and second controllers through at least the first and second node devices.

In another aspect of the present invention, a program is provided for causing a computer or a network device to perform the operations of respective devices in the above-described communication method. The program may be stored in a storage device or a non-transitory recording medium.

The present invention enables establishing a communication connection between controllers of adjacent networks.

BRIEF DESCRIPTION OF DRAWINGS

FIG. 6A shows exemplary contents of a processing rule defined for a first network.

FIG. 6B shows exemplary contents of a processing rule defined for a second network.

FIG. 9A shows exemplary contents of a sorting rule defined for the controller of the first network.

FIG. 9B shows exemplary contents of a sorting rule defined for the controller of the second network.

FIG. 11A shows exemplary contents of a sorting rule defined for the controller of the first network.

FIG. 11B shows exemplary contents of a sorting rule defined for the controller of the second network.

DESCRIPTION OF EXEMPLARY EMBODIMENTS

Embodiments of the present invention are described in the following with an example in which OpenFlow networks, which are a sort of networks managed by a centralized management, are used. It should be noted, however, that the present invention is not limited to a communication system in which OpenFlow networks are used.
<Embodiment>
Embodiments of the present invention are described below in details with reference to the attached drawings.
<System Configuration>

Figure 1:
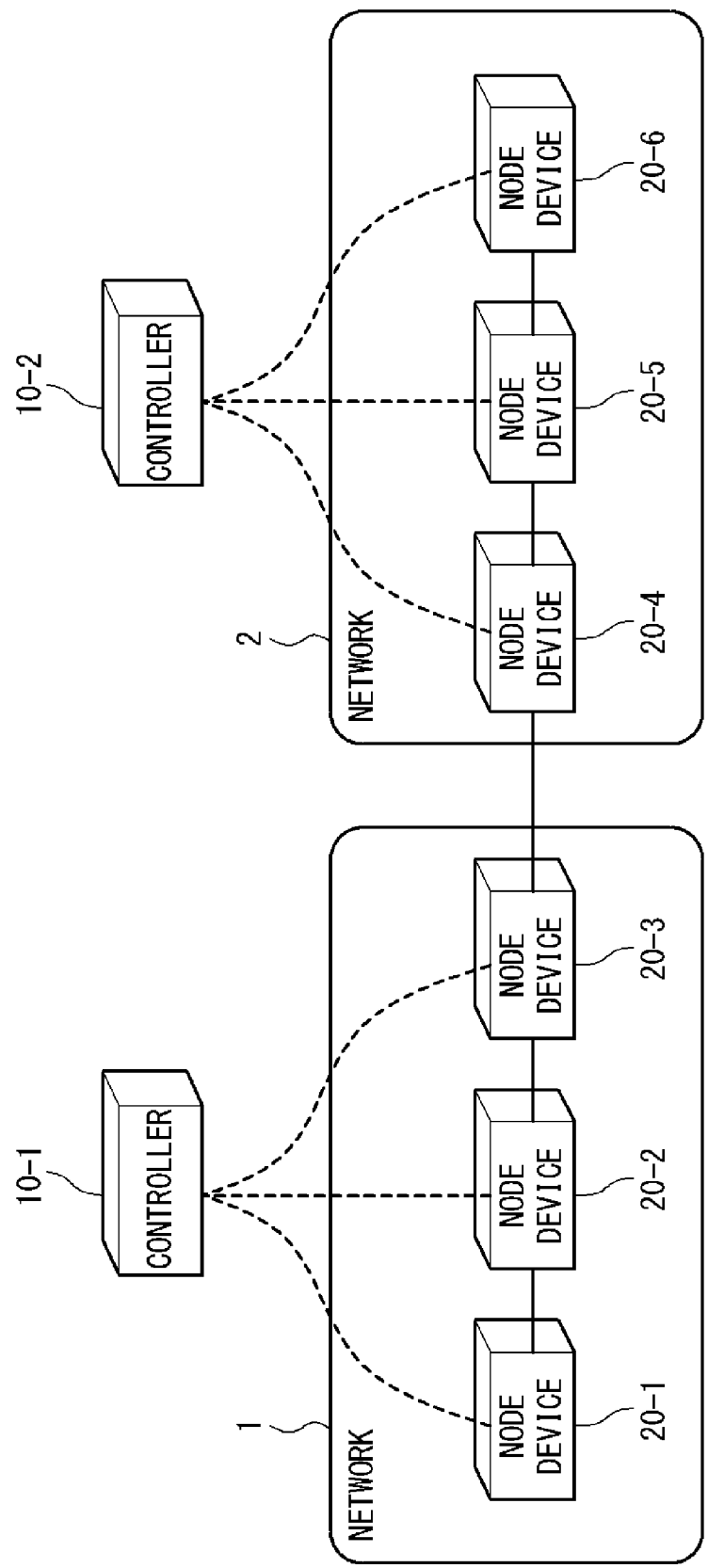
FIG. 1 shows an exemplary configuration of a communications system according to the present invention.

A description is first given of an exemplary configuration of a communications system in one embodiment of the present invention with reference to FIG. 1.

In one embodiment, a communications system includes controllers 10 and node devices 20.

The controllers 10 are information processing apparatuses which control the node devices 20.

The node devices 20 are communication devices provided in networks.

The controllers 10 and the node devices 20 are connected through control channels. The controllers 10 and the node devices 20 communicate with each other by using Open-Flow messages defined in an OpenFlow protocol via the control channels.

Each node device 20 is connected to the adjacent node device 20 via a data communication link such as a LAN (local area network) and the like. Moreover, a node device 20 which operates as an edge switch is adapted to have a connection with a host (a client, a server or the like) or an external network device which does not belong to the network in which the node device 20 is provided.

It should be noted that the controllers 10 and the node devices 20 are not limited to physical machines; the controllers 10 and the node devices 20 may be a virtual machine (VM).

FIG. 1 shows controllers 10-1 and 10-2, as examples of the controllers 10. FIG. 1 also shows node devices 20-1 to 20-6 as examples of the node devices 20.

The controller 10-1 is connected via a control channel to each of the node devices 20-1 to 20-3.

The controller 10-2 is connected via a control channel to each of the node devices 20-4 to 20-6.

The node devices 20-1 to 20-6 are each connected to one or more adjacent node devices via one or more data communication links, such as LANs.

In this embodiment, the node device 20-1 is connected to the node device 20-2 via a data communication link. The node device 20-2 is connected to the node device 20-3 via a data communication link. The node device 20-3 is connected to the node device 20-4 via a data communication link. The node device 20-4 is connected to the node device 20-5 via a data communication link. The node device 20-5 is connected to the node device 20-6 via a data communication link.

The node devices 20-1 to 20-3 are provided in a network 1. That is, each of the node devices 20-1 to 20-3 is arranged in the network 1.

The node devices 20-4 to 20-6 are arranged in the network 2. That is, each of the node devices 20-4 to 20-6 is arranged in the network 2.

Accordingly, that the networks 1 and 2 are connected to each other via the data communication link connecting the node device 20-3 and the node device 20-4.

It should be noted that the control channels and the data communication links may be a wired communication link or a wireless communication link.

(Identification Information of Controllers and Node Devices)

In this embodiment, the controller 10-1 is assigned with a controller ID "CPID1" as its own identification information. The controller 10-2 is assigned with a controller ID "CPID2" as its own identification information. The node device 20-1 is assigned with a node device ID "DPID1" as its own identification information. The node device 20-2 is assigned with a node device ID "DPID2" as its own identification information. The node device 20-3 is assigned with a node device ID "DPID3" as its own identification information. The node device 20-4 is assigned with a node device ID "DPID4" as its own identification information. The node device 20-5 is assigned with a node device ID "DPID5" as its own identification information. The node device 20-6 is assigned with a node device ID "DPID6" as its own identification information.

<First Embodiment>

A first embodiment of the present invention is described below.

In this embodiment, the controllers 10 are each connected to one of the node devices 20 via a data communication link, similarly to the connections between the node devices 20. That is, the controllers 10 may also operate as a "host" connected to any of the node devices 20.

(System Configuration in First Embodiment)

An exemplary configuration of a communications system in this embodiment is described below with reference to FIG. 2.

In this embodiment, the controller 10-1 is further connected to the node device 20-1 through a data communication link. It should be noted that the controller 10-1 may be logically connected to the node device 20-1 by tunneling or the like in an actual implementation.

Similarly, the controller 10-2 is further connected to the node device 20-6 via a data communication link. It should be noted that the controller 10-2 may be logically connected to the node device 20-2 by tunneling or the like in an actual implementation.

It should be noted that the system configuration is not limited to the above-described embodiment.

(Configuration of Controllers)

An exemplary configuration of each controller 10 is described with reference to FIG. 3. Note that this exemplary configuration is common to both of the controllers 10-1 and 10-2.

Each controller 10 includes a node device control section 11 and an interface management section 15.

The node device control section 11 controls node devices 20 via control channels. For example, the node device control section 11 executes a software program which allows operating as an OpenFlow controller (OFC) in an OpenFlow network. Here, the node device control section 11 monitors and manages interface units contained in each of the node devices 20 via the control channels and specifies processing rules (flow entries) of packets transmitted and received by the interface units for the node devices 20. One example of the contents of a processing rule (a flow entry) of the packets may include an instruction of outputting to an interface unit or a node device control section 11 specified on the basis of the feature of each packet received by the interface unit, an instruction of outputting to an interface unit specified when the packet prepared by the node device control section 11 is received, and the like.

The interface management section 15 manages a network interface provided in the controller 10. In this embodiment, the interface management section 15 is adapted to have a connection to a network interface within any of the node devices 20 via data a communication link connected to the network interface within the controller 10.

In this embodiment, the node device control section 11 is connected to the interface management section 15. Thus, the node device control section 11 can communicate with any of the node devices 20 via the interface management section 15.

(Configuration of Node Device Control Unit)

An exemplary configuration of the node device control section 11 is described below.

The node device control section 11 includes a topology management section 111, a control message processing section 112, a node communication section 113, an adjacency discovery section 114, an identifying condition calculation section 115, a route calculation section 116, a processing rule calculation section 117, a processing rule management section 118 and a processing rule storage section 119.

The topology management section 111 manages topology information and boundary information of its own network. The topology management section 111 is connected to the interface management section 15.

The control message processing section 112 prepares control messages in accordance with controls to be performed for the node devices 20. The control message processing section 112 also analyzes control messages received from the node device 20.

The node communication section 113 is connected to node devices 20 via control channels to communicate with the node devices 20. The node communication section 113 transmits control messages to the node devices 20 in response to control message transmission requests from the control message processing section 112. The node communication section 113 also transfers control messages received from the node devices 20 to the control message processing section 112.

The adjacency discovery section 114 discovers a node device 20 located on the boundary with a different network and the controller 10 in the different network.

The identifying condition calculation section 115 calculates identifying conditions (or the identifying rules) of packets. In this embodiment, the identifying condition calculation section 115 calculates identifying conditions (or identifying rules) of packets transferred between the controllers 10 on the basis of the topology information and the boundary information of its own network. The identifying condition calculation section 115 is also adapted to, when receiving inquiry information of the first packet from a node device 20, calculate identifying conditions (or an identifying rule) of the packet on the basis of the header information of the packet.

The route calculation section 116 calculates transfer routes of packets. Here, the route calculation section 116 determines the end points of the route to be used in the packet transfer between the controllers 10 on the basis of the topology information and the boundary information of the networks, and calculates the route to connect the determined end points.

The processing rule calculation section 117 calculates processing rules (or flow entries) on the basis of the identifying conditions calculated by the identifying condition calculation section 115, and the routes calculated by the route calculation section 116.

The processing rule management section 118 manages the processing rules (or the flow entries). The processing rule management section 118 registers information related to the processing rules (or the flow entries) in the processing rule storage section 119, correlating information related to the processing rules with identification information (processing rule IDs) of the processing rules (or the flow entries). The processing rule management section 118 also requests the control message processing section 112 to set the node devices 20 with processing rules (or flow entries).

The processing rule storage section 119 stores: the information with regard to the processing rules (or the flow entries) set to the respective node devices 20 under the management of the controller 10; and the identification information (the processing rules ID) of the processing rules (or the flow entries). In an actual implementation, the processing rule storage section 119 may store copies or master tables of the route control information (or the flow table) of the respective node devices 20.

(Configuration of Node Devices)

An exemplary configuration of each node device 20 is described with reference to FIG. 4. Note that this exemplary configuration is common to all of the node devices 20-1 to 20-6.

Each node device 20 includes a communication unit 21 and one or more interface units 22 (one shown).

The communication unit 21 is connected to a controller 10 via a control channel to exchange control messages. In one example, the communication unit 21 executes a software program which allows operating as an OpenFlow switch (OFS) in an OpenFlow network. The communication unit 21 also processes a packet inputted from a interface unit 22 in accordance with processing rules (or flow entries) and processing commands (output instructions or the like), which are specified by the node device control section 11 in the controller 10. It should be noted that, when neither processing rule (flow entry) nor processing command (output instructions or the like) is specified for an inputted packet, the communication unit 21 judges the packet as the first packet and transmits inquiry information of this packet to the controller 10 through the control channel.

The interface unit 22 is a network interface provided within the node device 20. The interface unit 22 may be a network interface having physical ports or a network interface having virtual ports. The interface unit 22 is used for establishing a connection to a connection destination, such as an adjacent node device and a host and adapted to exchange packets through a data communication link. The interface unit 22 may be used for establish a connection with a controller 10. When receiving a packet from a connection destination, such as an adjacent node device and a host, the interface unit 22 outputs the packet to the communication unit 21.

(Topology Retrieving Process in First Embodiment)

An exemplary topology retrieving process in the first embodiment is described below.

Each of the controllers 10-1 and 10-2 prepares topology retrieval packets in order to retrieve the topology of its own network. In one embodiment, LLDP (Link Layer Discovery Protocol) frames may be used as topology retrieval packets. It should be noted that topology retrieval packets are not limited to LLDP frames and packets other than LLDP frames may be used as topology retrieval packets in an actual implementation.

In this embodiment, LLDP frames are used as exemplary topology retrieval packets.

(LLDP Frame Format in First Embodiment)

An exemplary format of LLDP frames in this embodiment is described with reference to FIG. 5.

In this embodiment, each LLDP frame includes an "LLDP header" region (or field), and an "optional TLVs" region (or field). Note that "TLV" stands for type, length and value.

The "LLDP header" region includes a "source MAC address" region, a "destination MAC address" region and an "ether type" region, which is denoted by the legend "eth_type".

The "source MAC address" region contains the source MAC address of the LLDP frame.

The "destination MAC address" contains the destination source MAC address of the LLDP frame.

The "ether type" region contains information that indicates the ether type of the LLDP frame. Usually, "0x88cc" is specified as the ether type of the LLDP frame.

The "optional TLVs" region includes an "identification information" region (or a "controller ID" region).

The "identification information" region contains the identification information (or the controller ID) of the controller that prepares the LLDP header.

Various types of identification information (or the controller ID) may be used if they are unique in the networks. For example, a MAC address of the interface of the controller 10, an IP address, a VLAN tag information (VLAN ID) and the like may be used as the identification information. It should be noted that identification information actually-used is not limited to these example.

(Procedure of Topology Retrieval in First Embodiment)

Next, an exemplary procedure of the topology retrieval in the first embodiment is described below.

(1) Operation for Transmitting LLDP Frame

First, a description is given of an exemplary operation in which LLDP frames are transmitted from the controllers 10 to the node devices 20.

The topology management section 111 in each of the controllers 10-1 and 10-2 prepares LLDP frames as topology retrieval packets.

At this time, the topology management unit 111 in each of the controllers 10-1 and 10-2 incorporates its own identification information (or controller ID) into each LLDP frame to identify the controller; the identification information (or the controller ID) in each LLDP frame is defined to be unique among the networks.

Figure 5:
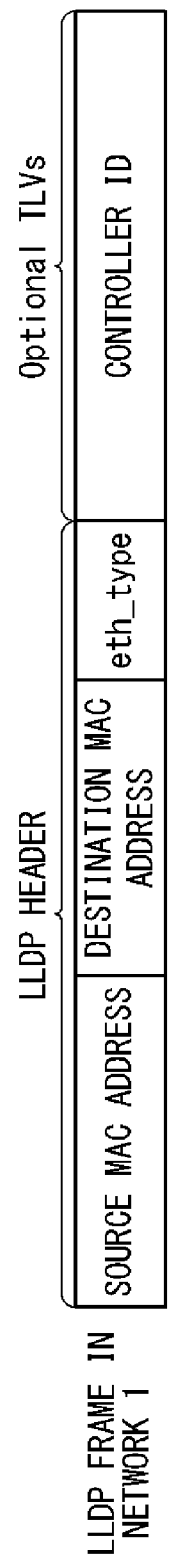
FIG. 5 shows an exemplary configuration of an LLDP frame in the first embodiment.

In this embodiment, the topology management section 111 in each of the controllers 10-1 and 10-2 incorporates identification information (or the controller ID) of the controller 10-1 or 10-2 into the "identification information" region of the "optional TLVs" region within each LLDP frame as shown in FIG. 5.

The topology management section 111 in each of the controllers 10-1 and 10-2 requests the control message processing section 112 to instruct to transmit the LLDP frames to the node devices 20. In an actual implementation, the topology management section 111 may only output the LLDP frames to the control message processing section 112.

The control message processing section 112 in each of the controllers 10-1 and 10-2 prepares packet-out messages each incorporating an LLDP frame and a transmission instruction thereof in response to the request of the transmission instruction of the LLDP frames to the node devices 20, and requests the node communication section 113 to transmit the packet-out messages to all of the node devices 20 provided in its own network. The packet-out message is a sort of control messages. The packet-out messages include transmission instructions which instruct to transmit the LLDP frame from all the interface units 22 in each node devices 20.

The node communication section 113 in each of the controllers 10-1 and 10-2 transmits the packet-out messages from the control message processing section 112 to all of the node devices 20 provided in its own network through the control channels.

The communication unit 21 in each node device 20 transmits the LLDP frame to the connection destinations from all the interface units 22 in its own node device 20, in response to the above-described packet-out message. That is, the communication unit 21 in each node device 20 transmits the LLDP frame in the form of broadcasting. Also, the communication unit 21 in each node device 20 receives the LLDP frames from the connection destinations via the interface units 22.

(2) Operation for Transmitting Inquiry Information of LLDP Frame Via Control Channel In the following, a description is given of an exemplary operation of transmitting inquiry information of an LLDP frame from each node device 20 to the controller 10 via the control channel.

When receiving an LLDP frame from a connection destination via an interface unit 22, the communication unit 21 in each node device 20 transmits a packet-in message as inquiry information to the controller 10 that controls the node device 20, through the control channel. The packet-in message is a sort of control messages.

The packet-in message includes an "LLDP frame" region, a "node device ID" region an "interface ID" region.

The "LLDP frame" region contains the received LLDP frame.

The "node device ID" region contains the identification information (or the node device ID) of the node device 20.

The "interface ID" region contains identification information (or the interface ID) of the interface unit 22 that receives the LLDP frame.

Usually, the communication unit 21 in each node device 20 receives LLDP frames containing identification information (the controller ID) of the controller 10 of the same network from the node device 20 of the same network, and transmits packet-in messages respectively incorporating the LLDP frames as the inquiry information to the controller 10.

When the source is the node device 20-3 and the destination is the node device 20-4, however, an LLDP frame containing identification information (or the controller ID) of the controller 10-1 is transmitted to the controller 10-2. That is, when receiving the LLDP frame having the identification information (controller ID) of the controller 10-1 from the node device 20-3, the communication unit 21 in the node device 20-4 transmits a packet-in message containing the LLDP frame as the inquiry information to the controller 10-2.

When the source is the node device 20-4 and the destination is the node device 20-3, on the other hand, the LLDP frame which has the identification information (or the controller ID) of the controller 10-2 is transmitted to the controller 10-1. That is, when receiving the LLDP frame having the identification information (or the controller ID) of the controller 10-2 from the node device 20-4, the communication unit 21 in the node device 20-3 transmits a packet-in message incorporating the LLDP frame as the inquiry information to the controller 10-1.

The node communication section 113 in each of the controllers 10-1 and 10-2 receives the above packet-in messages from the respective node devices 20 connected thereto via the control channels and outputs the packet-in messages to the control message processing section 112.

The control message processing section 112 in each of the controllers 10-1 and 10-2 analyzes the above packet-in messages and extracts the LLDP frames incorporated in the packet-in messages. The control message processing section 112 outputs the extracted LLDP frames to the adjacency discovery section 114.

The adjacency discovery section 114 in each of the controllers 10-1 and 10-2 determines whether the identification information (or the controller ID) described in each LLDP frame is identical to the identification information (controller ID) of its own controller 10.

In this embodiment, the adjacency discovery section 114 in each of the controllers 10-1 and 10-2 refers to the "identification information" region of the "optional TLVs" region of each LLDP frame (see FIG. 5) and determines whether the identification information (or the controller ID) incorporated in the "identification information" region is identical to the identification information (or the controller ID) of its own controller 10.

If the identification information (controller ID) incorporated in an LLDP frame is identical to the identification information (or the controller ID) of its own controller 10, the adjacency discovery section 114 in each of the controllers 10-1 and 10-2 can dynamically detect and monitor the node device 20 adjacent to another node device only in its own network and the interface units 22 of the node device 20.

If the identification information (controller ID) in an LLDP frame is different from the identification information (or the controller ID) of its own controller 10, the adjacency discovery section 114 in each of the controllers 10-1 and 10-2 can detect the existence of a controller 10 in a different network. Moreover, the adjacency discovery section 114 can dynamically detect and monitor a node device 20 at the boundary with the different network and the interface units 22 of the node device 20.

(3) Operation for Transmitting LLDP Frame Via Data Communication Link

An exemplary operation for transmitting an LLDP frame from each node device 20 to the controller 10 via a data communication link is described below.

A communication unit 21 in a node device 20 connected to the controller 10 via a data communication link, for example, the node device 20-1, transmits the LLDP frame also from the interface unit 22 connected to the controller 10. For example, the communication unit 21 in the node device 20-1 transmits the LLDP frame to the controller 10-1 from the interface unit 22 connected to the controller 10-1 via the data communication link. Similarly, the node device 20-6 transmits the LLDP frame to the controller 10-2 from the interface unit 22 connected to the controller 10-2 via the data communication link.

The interface management section 15 in each of the controllers 10-1 and 10-2 receives the LLDP frame from each node device 20 of the connection destination, via the data communication link, and outputs the LLDP frame to the adjacency discovery section 114.

The adjacency discovery section 114 in each of the controllers 10-1 and 10-2 determines whether the identification information (or the controller ID) described in the LLDP frame is identical to the identification information (controller ID) of its own controller 10.

If the identification information (controller ID) incorporated in the LLDP frame is identical to the identification information (or the controller ID) of the controller 10, the adjacency discovery section 114 in each of the controllers 10-1 and 10-2 can dynamically detect and monitor the node device 20 connected to the controller 10 and the interface units thereof.

(4) Operation for Preparing Topology Information

An exemplary operation for preparing topology information in the controller 10 is described below.

The adjacency discovery section 114 in each of the controllers 10-1 and 10-2 sends information detected or obtained by the above-described operations, to the topology management section 111.

The topology management section 111 in each of the controllers 10-1 and 10-2 prepares and stores topology information and boundary information of the corresponding network on the basis of the information received from the adjacency discovery section 114.

(Note)

The detecting method of the node devices 20 connected to the controller 10 and the interface units 22 thereof is not limited to this method in an actual implementation. For example, information related to each node device 20 connected to the controller 10 and the interface units 22 thereof may be notified and set in advance by a manual operation by an operator or the like.

(Operation for Mutual Notification of Judging Conditions of Packets Between Controllers in First Embodiment)

An exemplary operation for mutual notification of identifying conditions (or identifying rules) of packets between the controllers 10 in the first embodiment is described below.

The identifying condition calculation section 115 in each of the controllers 10-1 and 10-2 calculates identifying conditions (or identifying rules) of packets used to communicate with the controller 10 in a different network on the basis of the topology information and the boundary information of its own network, which are stored in the topology management section 111, and prepares a notification packet that stores the identifying conditions (or the identifying rules). Moreover, the identifying condition calculation section 115 requests and instructs the control message processing section 112 to transmit the notification packet to a node device 20 at the boundary with a different network. The identifying conditions (or the identifying rules) are attached to the packet header, which may include the MAC address, the IP address or the protocol type. It should be noted that in an actual implementation, the identifying condition calculation section 115 may only output the notification packet to the control message processing section 112.

The control message processing section 112 in each of the controllers 10-1 and 10-2 prepares a packet-out message incorporating the notification packet and an instruction to output the notification packet to a node device 20 in a different network in response to a request for instructing transmission of the notification packet to a node device 20 at the boundary with the different network. Moreover, the control message processing section 112 requests the node communication section 113 to transmit the packet-out message to the node device 20 at the boundary with the different network.

The node communication section 113 in each of the controllers 10-1 and 10-2 transmits the above packet-out message to the node device 20 at the boundary with the different network via the control channel, in response to the transmission request of the packet-out message from the control message processing section 112.

When receiving the above-described packet-out message via the control channel, the communication unit 21 in the node device 20 at the boundary with the different network transmits the notification packet to the node device 20 in the different network through the data communication link from the interface unit 22 connected to the node device 20 in the different network, on the basis of the instruction of outputting the notification packet to the node device 20 in the different network.

When a notification packet is inputted from the interface unit 22 connected to the node device 20 in the different network, the communication unit 21 in the node device 20 at the boundary with the different network transmits a packet-in message incorporating the notification packet as inquiry information to the controller 10 that controls its own node device 20.

The node communication section 113 in each of the controllers 10-1 and 10-2 receives the above-described packet-in message from each node device 20 connected thereto via the control channel and outputs the packet-in message to the control message processing section 112.

The control message processing section 112 in each of the controllers 10-1 and 10-2 analyzes the above-described packet-in message and extracts the notification packet incorporated in the packet-in message. The control message processing section 112 then outputs the notification packet to the adjacency discovery section 114.

The identifying condition calculation section 115 in each of the controllers 10-1 and 10-2 recognizes the identifying conditions (or the identifying rules) of packets used to communicate with the controller 10 in the different network, on the basis of the notification packet.

As a result, the controllers 10-1 and 10-2 can recognize the identifying conditions (or the identifying rules) of packets used in the mutual communications.

(1) Notification to Controller 10-2 from Controller 10-1

An exemplary operation of notifying identifying conditions (or identifying rules) of packets from the controller 10-1 to the controller 10-2 is described.

The controller 10-1 prepares a notification packet incorporating identifying conditions (or identifying rules) of packets used to communicate with the controller 10-2 and transmits a packet-out message incorporating the notification packet and an instruction of outputting the notification packet to the node device 20-4 to the node device 20-3 at the boundary with the different network via the control channel.

When receiving the packet-out message from the controller 10-1, the node device 20-3 transmits the notification packet from the interface unit 22 connected to the node device 20-4 in accordance with the instruction of outputting the notification packet to the node device 20-4.

When receiving the notification packet from the node device 20-3, the node device 20-4 transmits a packet-in message incorporating the notification packet as inquiry information to the controller 10-2, which controls the node device 20-4, via the control channel.

The controller 10-2 receives the packet-in message from the node device 20-3 and obtains the notification packet incorporated in the packet-in message. This allows the controller 10-2 to recognize the identifying conditions (or the identifying rules) of packets used to communicate with the controller 10-1.

(2) Notification to Controller 10-1 from Controller 10-2

An exemplary operation of notification of identifying conditions (or identifying rules) of packets from the controller 10-2 to the controller 10-1 is described.

The controller 10-2 prepares a notification packet incorporating identifying conditions (or identifying rules) of packets used to communicate with the controller 10-1, and transmits a packet-out message incorporating the notification packet and an instruction of outputting the notification packet to the node device 20-3, to the node device 20-4 at the boundary with the different network via the control channel.

When receiving the packet-out message from the controller 10-2, the node device 20-4 transmits the notification packet from the interface 22 connected to the node device 20-3 in accordance with the instruction of outputting the notification packet to the node device 20-3.

When receiving the notification packet from the node device 20-4, the node device 20-3 transmits a packet-in message incorporating the notification packet as inquiry information to the controller 10-1, which controls the node device 20-3 via the control channel.

The controller 10-1 receives the packet-in message from the node device 20-4 and obtains the notification packet incorporated in the packet-in message. This allows the controller 10-1 to recognize the identifying conditions (or the identifying rule) of packets used to communicate with the controller 10-2.

(Operation for Setting Processing Rules in First Embodiment)

An exemplary operation for setting processing rules (or flow entries) in the first embodiment is described below.

The identifying condition calculation section 115 in each of the controllers 10-1 and 10-2 calculates identifying conditions (or identifying rules) of packets used to communicate with the controller 10 in the different network, on the basis of the topology information and the boundary information of its own network which are stored in the topology management section 111. Also, the identifying condition calculation section 115 recognizes identifying conditions (or an identifying rule) of packets notified by the controller 10 in the different network.

The route calculation section 116 in each of the controllers 10-1 and 10-2 determines the end points of a route to be used in the communication, on the basis of the topology information and the boundary information of the network stored in the topology management section 111.

At this time, one of the end points of the route is defined as the node device at the boundary of the different network. In the network 1, the node device 20-3 is defined as one of the end points. In the network 2, the node device 20-4 is defined as one of the end points.

Also, the other end point of the route is defined as the node device connected to the controller via a data communication link. In the network 1, the node device 20-1 is defined as the other end point. In the network 2, the node device 20-6 is defined as the other end point.

The route calculation section 116 in each of the controllers 10-1 and 10-2 calculates a route which connects the end points thus-determined. Specifically, the route calculation section 116 determines a bi-directional transfer route which connects the interfaces of the determined node devices 20.

In this embodiment, the route calculation section 116 in the controller 10-1 calculates the route which connects the interface unit used for connection to controller 10-1 in the node device 20-1 in the network 1 to the interface unit used for connection to the node device 20-4 in the network 2 in the node device 20-3.

Similarly, the route calculation section 116 in the controller 10-2 calculates the route which connects the interface unit used for connection to controller 10-2 in the node device 20-6 in the network 2 and the interface unit used for connection to the node device 20-3 in the network 1 in the node device 20-4.

The processing rule calculation section 117 in each of the controllers 10-1 and 10-2 obtains the route to be used for transfer from the route calculation section 116 and obtains the identifying conditions (or the identifying rules) of packets transferred on the route from the identifying condition calculation section 115.

The processing rule calculation section 117 in each of the controllers 10-1 and 10-2 uses the obtained information to calculate processing required to transfer the packets in each node device 20 on the route, and calculates the processing rules (or the flow entries) in which the packet identifying conditions (or the packet identifying rules) are defined as conditions under which the processing is to be performed. At this time, the processing rule calculation section 117 incorporates the identification information (processing rule ID) into each calculated processing rule (or flow entry). Specifically, the processing rule ID is incorporated in a cookie region (a region of 64 bits in which any information can be stored) in each processing rule (or flow entry).

The processing rule management section 118 in each of the controllers 10-1 and 10-2 registers information related to the processing rules (or the flow entries) calculated by the processing rule calculation section 117 into the processing rule storage section 119, and requests the control message processing section 112 to set processing rules (or the flow entries) for each node devices 20 on the route.

When receiving the setting request of processing rules (or flow entries) for the node devices 20, the control message processing section 112 in each of the controllers 10-1 and 10-2 prepares flow modification messages (or FlowMod-Add) in order to register the processing rules (or the flow entries) in the node devices 20. After that, the control message processing section 112 requests the node communication section 113 to transmit the flow modification messages (or FlowMod-Add) to the node devices 20 on the route. The flow modification messages (or FlowMod-Add) are a sort of control messages.

When receiving the transmission request of the flow modification messages (FlowMod-Add) to the node devices 20, the node communication section 113 in each of the controllers 10-1 and 10-2 transmits the flow modification messages (FlowMod-Add) to the node devices 20 on the route via the control channels.

When receiving a flow modification message (FlowMod-Add) from the controller 10 via the control channel, the communication unit 21 in each node device 20 registers the processing rules (or the flow entries) on the basis of the contents of the flow modification message (or FlowMod-Add).

When then receiving a packet through a interface unit 22, the communication unit 21 in each node device 20 processes the received packet in accordance with the contents of the registered processing rules (or the flow entries).

(Summary of First Embodiment)

In this way, the above-described operation for setting the processing rules (or the flow entries) is carried out independently in the networks 1 and 2. As result, a bidirectional transfer route is established between the controllers 10.

Each of the controllers 10-1 and 10-2 determines the identifying conditions (or the identifying rules) of packets used in the mutual communications.

Each of the controllers 10-1 and 10-2 calculates the bidirectional route within its own network and specifies the node devices on the route and the interface units thereof.

Each of the controllers 10-1 and 10-2 prepares processing rules (or flow entries) that defines a set of identifying conditions (or identifying rules) and contents of processing (or actions) which involves outputting packets to the interface unit connected to the adjacent node device, for the node devices on the route.

In this embodiment, each of the controllers 10-1 and 10-2 sets the node devices 20 under the control of the each controller 10 with processing rules (or the flow entries) which allows transferring packets from the node device at the boundary with the adjacent network to the node device connected to the controller 10 via the data communication link. For example, the controller 10-1 sets each of the node devices 20-1 to 20-3 with processing rules (or flow entries) which allows transfer of packets from the node device 20-3 to the node device 20-1. The controller 10-2 sets each of the node devices 20-4 to 20-6 with processing rules (or flow entries) which allows transfer of packets from the node device 20-4 to the node device 20-6.

Also, each of the controllers 10-1 and 10-2 sets the node devices 20 under its control with processing rules (or flow entries) which allows transfers of packets from the node device connected via the data communication link to the interface unit of the node device at the boundary with the adjacent network. For example, the controller 10-1 sets each of the node devices 20-1 to 20-3 with processing rules (or flow entries) which allows transfer of packets from the node device 20-1 to the node device 20-3. The controller 10-2 sets each of the node devices 20-4 to 20-6 with processing rules (or flow entries) which allows transfer of packets from the node device 20-6 to the node device 20-4.

Since the above-described operations are carried out in each of the adjacent networks, the transfer route is established in each of the networks, this enables communications between the controllers without direct transactions between adjacent networks.

Note that the link connection implies connection through a data communication link.

(Format of Processing Rule)

An exemplary format of the processing rules (or the flow entries) is described with reference to FIG. 6A and FIG. 6B.

A processing rule (or a flow entry) includes an identifying condition region (or an identifying rule region) and a contents-of-processing region (or an action region).

The identifying condition region (or the identifying rule region) includes the "source MAC address" region, a "destination MAC address" region and an "ether type" region (or an "eth_type" region).

The "source MAC address" region contains the MAC address of the network interface of the source of the packet.

The "destination MAC address" region contains the MAC address of the network interface of the destination of the packet.

The "ether type" region contains information indicating the ether type of the packet.

The "contents-of-processing" region include an "action" region.

The "action" region contains an instruction of outputting the packet to a predetermined output destination.

In this embodiment, each controller is allowed to flexibly use various types of packets for each counterpart controller.

(Processing Rule in Network 1)

FIG. 6A shows an example of processing rules (or flow entries) respectively set to the node devices 20-1 to 20-3 from the controller 10-1 in the network 1.

(1) Processing Rule (Flow Entry) from Node Device 20-1 to Controller 10-1
Source MAC address:
MAC address of controller 10-2
Destination MAC address:
MAC address of controller 10-1
Ether Type (eth_type): 0x8800
Action: output to the controller 10-1

(2) Processing Rule (Flow Entry) from Node Device 20-1 to Node Device 20-2
Source MAC Address:
MAC address of controller 10-1
Destination MAC address:
MAC address of controller 10-2
Ether Type (eth_type): 0x8800
Action: output to node device 20-2

(3) Processing Rule (Flow Entry) from Node Device 20-2 to Node Device 20-1
Source MAC address:
MAC address of controller 10-2
Destination MAC address:
MAC address of controller 10-1
Ether Type (eth_type): 0x8800
Action: output to node device 20-1

(4) Processing Rule (Flow Entry) from Node Device 20-2 to Node Device 20-3
Source MAC address:
MAC address of controller 10-1
Destination MAC address:
MAC address of controller 10-2
Ether type (eth_type): 0x8800
Action: output to node device 20-3

(5) Processing Rule (Flow Entry) from Node Device 20-3 to Node Device 20-2
Source MAC address:
MAC address of controller 10-2
Destination MAC address: MAC Address of controller 10-1
Ether type (eth_type): 0x8800
Action: output to node device 20-2

(6) Processing Rule (Flow Entry) from Node Device 20-3 to Node Device 20-4
Source MAC address]:
MAC address of controller 10-1
Destination MAC address:
MAC Address of controller 10-2
Ether type (eth_type): 0x8800
Action: output to node device 20-4

The above-described processing rules (1) and (2) are processing rules (or flow entries) used in the node device 20-1.

The above-described processing rules (3) and (4) are processing rules (or flow entries) used in the node device 20-2.

The above-described processing rules (5) and (6) are processing rules (or flow entries) used in the node device 20-3.

(Processing Rule in Network 2)

FIG. 6B shows an example of the processing rule (or the flow entry) set to each of the node devices 20-4 to 20-6 from the controller 10-2 in the network 2.

(1) Processing Rule (Flow Entry) from Node Device 20-4 to Node Device 20-3
Source MAC address:
MAC address of controller 10-2
Destination MAC Address:
MAC address of controller 10-1
Ether Type (eth_type): 0x8800
Action: output to node device 20-3

(2) Processing Rule (Flow Entry) from Node Device 20-4 to Node Device 20-5
Source MAC address:
MAC Address of controller 10-1
Destination MAC address:
MAC Address of controller 10-2
Ether type (eth_type): 0x8800
Action: output to node device 20-5

(3) Processing Rule (Flow Entry) from Node Device 20-5 to Node Device 20-4
Source MAC address:
MAC address of controller 10-2
Destination MAC address:
MAC Address of controller 10-1
Ether Type (eth_type): 0x8800
Action: output to node device 20-4

(4) Processing Rule (Flow Entry) from Node Device 20-5 to Node Device 20-6
Source MAC address]:
MAC address of controller 10-1
Destination MAC Address:
MAC address of controller 10-2
Ether Type (eth_type): 0x8800
Action: output to node device 20-6

(5) Processing Rule (Flow Entry) from Node Device 20-6 to Node Device 20-5
Source MAC address:
MAC address of controller 10-2
Destination MAC address:
MAC Address of controller 10-1
Ether type (eth_type): 0x8800
Action: output to node device 20-5

(6) Processing Rule (Flow Entry) from Node Device 20-6 to Controller 10-2
Source MAC address]:
MAC Address of controller 10-1
Destination MAC address:
MAC Address of controller 10-2
Ether type (eth_type): 0x8800
Action: output to controller 10-2

The above-described processing rules (1) and (2) are processing rules (or flow entries) used in the node device 20-4.

The above-described processing rules (3) and (4) are processing rules (or flow entries) used in the node device 20-5.

The above-described processing rules (5) and (6) are processing rules (or flow entries) used in the node device 20-6.

(Supplement)

The MAC address of the controller 10-1 means the MAC address of the network interface in the controller 10-1. Also, the MAC address of the controller 10-2 means the MAC address of the network interface in the controller 10-2.

It should be noted that the MAC address is merely one exemplary identifier used to identify the source and the destination. The IP address or the like may be used in place of the MAC address.

<Second Embodiment>

A description is given of a second embodiment of the present invention in the following.

In this embodiment, identifying conditions (or identifying rules) are also determined in the topology retrieval by using LLDP frames. Specifically, identifying conditions (or identifying rules) of packets are embedded in LLDP frames in addition to identification information (or the controller ID) of the controller when LLDP frames are prepared in the controller.

(Format of LLDP Frame in Second Embodiment)

An exemplary format of the LLDP frame in this embodiment is described with reference to FIG. 7.

In this embodiment, each LLDP frame includes an "LLDP header" region (or field) and an "optional TLVs" region.

The contents of the "LLDP header" region in the second embodiment are same as those in the first embodiment.

The "optional TLVs" region includes an "identification information" region (or a "controller ID" region, a "MAC address" region and an "ether type" region (or an "eth_type" region).

The "identification information" region contains identification information (or the controller ID) of the controller which prepares the LLDP frame.

The "MAC address" region contains a MAC address which is one of identifying conditions (or identifying rules) of packets.

The "ether type (eth_type)" region contains information that indicates an ether type which is one of identifying conditions (or identifying rules) of packets.

It should be noted that the MAC address is merely one exemplary identifier used to identify the source and the destination. The IP address or the like may be used in place of the MAC address.

That is, in this embodiment, identifying conditions (or identifying rules) of packets are stored in the "optional TLVs" region in each LLDP frame.

(System Configuration)

Figure 2:
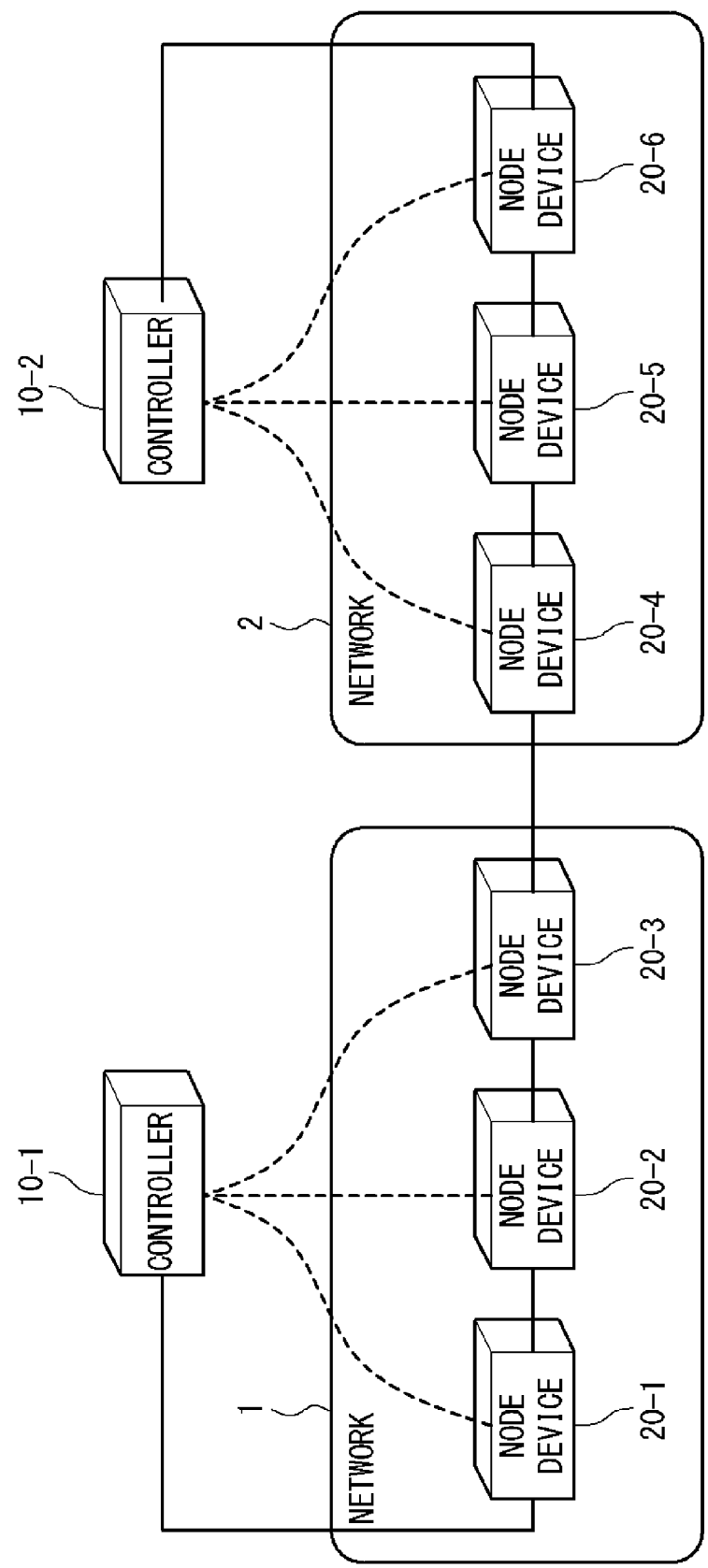
FIG. 2 shows an exemplary system configuration in a first embodiment.

This embodiment is described on the basis of the system configuration shown in FIG. 2, similarly to the first embodiment.

The configurations of the controllers 10 and the node devices 20 are basically similar to those of the first embodiment.

(Operation of Topology Retrieval in Second Embodiment)

An exemplary operation for topology retrieval in the second embodiment is described below.

First, the topology management section 111 in each of the controllers 10-1 and 10-2 prepares LLDP frames as topology retrieval packets, similarly to the first embodiment.

At this moment, the topology management section 111 in each of the controllers 10-1 and 10-2 incorporates identification information (or the controller ID) which indicates its own controller in each LLDP frame, the identification information being unique among the networks.

Figure 7:
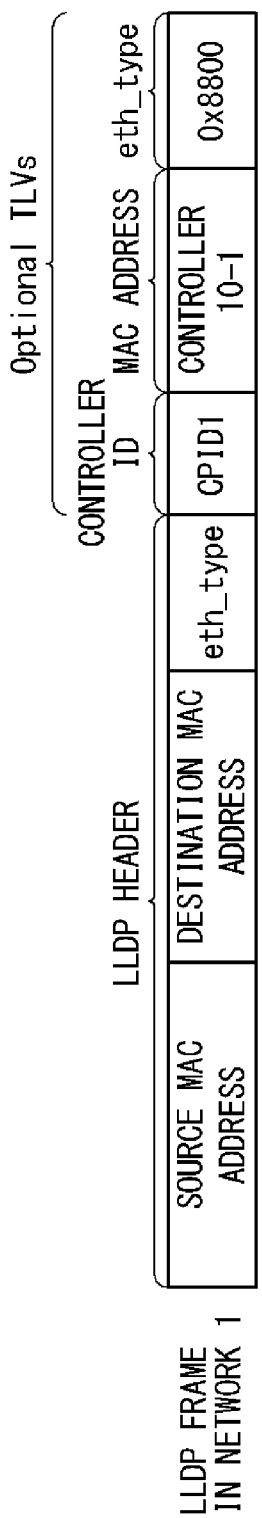
FIG. 7 shows an exemplary configuration of an LLDP frame in a second embodiment.

Here, the topology management section 111 in each of the controllers 10-1 and 10-2 incorporates the identification information (or the controller ID) of its own controller 10 into the "identification information" region in the "optional TLVs" region in each LLDP frame as shown in FIG. 7.

The topology management section 111 in each of the controllers 10-1 and 10-2 outputs the prepared LLDP frames to the identifying condition calculation section 115.

The identifying condition calculation section 115 in each of the controllers 10-1 and 10-2 calculates identifying conditions (or identifying rules) of packets used to communicate with the controller 10 in the different network, on the basis of the topology information and the boundary information of the networks which are stored in the topology management section 111.

In this embodiment, the identifying condition calculation section 115 in each of the controllers 10-1 and 10-2 incorporates identifying conditions (or identifying rules) of packets used to communicate with the adjacent node device 20 by each node device 20 into each LLDP frame.

In this embodiment, the identifying condition calculation section 115 in each of the controllers 10-1 and 10-2 incorporates the MAC address of the network interface within its own controller 10 in the "MAC address" region of the "optional TLVs" region in each LLDP frame as shown in FIG. 7.

Also, the identifying condition calculation section 115 in each of the controllers 10-1 and 10-2 incorporates information indicating the ether type of packets used to communicate with the controller 10 in the different network in the "ether type" region of the "optional TLVs" region in each LLDP frame as shown in FIG. 7.

At this moment, the identification information (or the controller ID) of the controller and identifying conditions (or rules) of packets are contained in each LLDP frame.

The identifying condition calculation section 115 in each of the controllers 10-1 and 10-2 requests the control message processing section 112 to instruct transmission of the LLDP frame to each node device 20. In an actual implementation, the identifying condition calculation section 115 may only output the LLDP frames to the control message processing section 112. It should be noted that, in an actual implementation, the identifying condition calculation section 115 may return the LLDP frames in which identifying conditions (or rules) of packets are embedded to the topology management section 111. In this case, similarly to the first embodiment, the topology management section 111 requests the control message processing section 112 to instruct transmission of the LLDP frame to each node device 20.

The control message processing section 112 in each of the controllers 10-1 and 10-2 prepares the packet-out message incorporating the LLDP frame and the transmission instruction, in response to the request for instructing the transmission of the LLDP frame to each node device 20, and requests the node communication section 113 to transmit the packet-out message to all of the node devices 20 in its own network. The packet-out message includes transmission instructions which instruct to transmit the LLDP frame from all of the interface units 22 in each node device 20.

The node communication section 113 in each of the controllers 10-1 and 10-2 transmits the packet-out message from the control message processing section 112 to all of the node devices 20 in its own network.

The communication unit 21 in each node device 20 transmits the LLDP frame to the connection destinations from all of the interface units 22 in the node device 20. Also, the communication unit 21 receives the LLDP frames from the connection destinations via the interface units 22.

The communication unit 21 in each node device 20 transmits the packet-in message as inquiry information to the controller 10 that controls the node device 20 via the control channel. At this time, the communication unit 21 in each node device 20 incorporates the LLDP frame, interface information of the interface unit that receives the LLDP frame (or (the interface unit ID), and identification information of the node device (or the node device ID) in the packet-in message.

Usually, the communication unit 21 in each node device 20 receives an LLDP frame having the identification information (or the controller ID) of the controller 10 in the same network from the node device 20 in the same network, and transmits a packet-in message incorporating the LLDP frame as inquiry information to the controller 10.

When the source is the node device 20-3 and the destination is the node device 20-4, however, an LLDP frame having identification information (the controller ID) of the controller 10-1 is transmitted to the controller 10-2. That is, when receiving an LLDP frame having identification information (or the controller ID) of the controller 10-1 from the node device 20-3, the communication unit 21 in the node device 20-4 transmits a packet-in message incorporating the LLDP frame as inquiry information to the controller 10-2.

When the source is the node device 20-4 and the destination is the node device 20-3, on the other hand, an LLDP frame having identification information (or the controller ID) of the controller 10-2 is transmitted to the controller 10-1. That is, when receiving the LLDP frame having identification information (or the controller ID) of the controller 10-2 from the node device 20-4, the communication unit 21 in the node device 20-3 transmits a packet-in message incorporating the LLDP frame as inquiry information to the controller 10-1.

The node communication section 113 in each of the controllers 10-1 and 10-2 receives the above-described packet-in message from each node device 20 of the connection destination through the control channel and outputs the packet-in message to the control message processing section 112.

The control message processing section 112 in each of the controllers 10-1 and 10-2 analyzes the received packet-in messages and extracts the LLDP frames incorporated in the packet-in messages. The control message processing section 112 outputs the extracted LLDP frames to the adjacency discovery section 114 and the identifying condition calculation section 115.

The adjacency discovery section 114 in each of the controllers 10-1 and 10-2 operates similarly to the first embodiment.

In this embodiment, the identifying condition calculation section 115 in each of the controllers 10-1 and 10-2 determines whether the identification information (controller ID) contained in each LLDP frame is identical to the identification information (controller ID) of its own controller 10.

Here, the identifying condition calculation section 115 in each of the controllers 10-1 and 10-2 refers to the "identification information" region (or the "controller ID" region) of the "optional TLVs" region of the LLDP frame (see FIG. 7), and determines whether the identification information (or the controller ID) contained in the "identification information" region (or the "controller ID" region) is identical to the identification information (or the controller ID) of its own controller 10.

If the identification information (controller ID) contained in an LLDP frame differs from the identification information (controller ID) of its own controller 10, the identifying condition calculation section 115 in each of the controllers 10-1 and 10-2 determines that the LLDP frame results from the controller 10 in the different network. In this case, the identifying condition calculation section 115 determines that the identifying conditions (or the rules) contained in the LLDP frame are the identifying conditions (or the identifying rules) of packets used to communicate with the controller 10 in the different network.

In this embodiment, the identifying condition calculation section 115 in each of the controllers 10-1 and 10-2 refers to the "MAC address" region of the "optional TLVs" region in the LLDP frame (see FIG. 7) and obtains the MAC address of the network interface in the controller 10 in the different network.

Also, the identifying condition calculation section 115 in each of the controllers 10-1 and 10-2 refers to the "ether type" region (or the "eth_type" region) of the "optional TLVs" region in the LLDP frame shown in FIG. 7, and obtains information that indicates the ether type of packets used to communicate with the controller 10 in the different network.

In this way, an LLDP frame prepared by each of the controllers 10-1 and 10-2 is transmitted from the interface units of each node device and this allows discovering of the network adjacency and recognizing the identifying conditions (or the rules) in the topology retrieval at the same time.

<Third Embodiment>

A third embodiment of the present invention is described below.

The system configuration of this embodiment is identical to that shown in FIG. 1.

The system configuration of this embodiment differs from the system configuration of the first embodiment shown in FIG. 2 in that the controllers 10 and the node devices 20 are logically connected via control channels; the interfaces are not physically connected to each other via data communication links.

Each controller 10 communicates with the node device 20 at the boundary with a different network. That is, the controller 10-1 communicates with the node device 20-3 via a control channel. The controller 10-2 communicates with the node device 20-4 via a control channel.

Each node device 20 at the boundary with a different network communicates with the node device 20 in the different network through a data communication link. In this embodiment, the node device 20-3 communicates with the node device 20-4 through a data communication link. The node device 20-4 communicates with the node device 20-3 through the data communication link.

In this embodiment, each controller 10 sets the node device 20 located on the boundary with a different network with processing rules (or flow entries) which instruct to, when receiving a packet addressed to the controller 10 in its own network from a different network, transfer the packet via the control channel to the controller 10 in its own network. That is, the controller 10-1 sets the node device 20-3 with processing rules (or flow entries) which instruct the node device 20-3 to transfer a packet addressed to the controller 10-1 when receiving the packet from the controller 10-2. The controller 10-2 sets the node device 20-4 with processing rules (or flow entries) which instruct the node device 20-3 to transfer a packet addressed to the controller 10-2 when receiving the packet from the controller 10-1.

This allows communications between the controllers 10-1 and 10-2.

(Configuration of Controller in Third Embodiment)

An exemplary configuration of the controller 10 in this embodiment is described with reference to FIG. 8. Note that this exemplary configuration is common to the controllers 10-1 and 10-2.

The controller 10 includes a node device control section 11, a sorting section 12, a sorting rule storage section 13, one or more virtual ports 14 (one shown) and an interface management section 15.

The node device control section 11 and the interface management section 15 basically have same functions as those in the first embodiment, The node device control section 11 controls the node devices 20 connected thereto via the control channels. For example, the node device control section 11 executes a software program which allows operating as an OpenFlow controller (OFC) in an OpenFlow network. Here, the node device control section 11 monitors and manages each interface unit contained in each node device 20 via the control channel, and sets each node device 20 with processing rules (or flow entries) for packets transmitted and received in its interface units. One example of the contents of a processing rule (a flow entry) of a packet may include an instruction to output to a interface unit or a node device control section 11 specified on the basis of the feature of the packet received by the interface unit, an instruction to, when a packet prepared by the node device control section 11 is received, output the packet to a specified interface unit, and the like.

In this embodiment, when receiving a packet from a node device 20, the node device control section 11 outputs the packet to the sorting section 12 after attaching information that identifies the node device 20 and the interface unit 22 of the source of the packet. Also, when receiving a packet from the sorting section 11, the node device control section 11 analyzes information attached to the packet that indicates the node device 20 and the interface unit 22 of the source of the packet and performs control to output the packet from a specified interface unit 22 in a specified node device 20 by issuing an output instruction specifying a proper control channel.

The sorting section 12, upon receiving a packet from a virtual port 14, refers to sorting rules stored in the sorting rule storage section 13 to specify a node device 20 and an interface unit 22 which are suitable as the output destination, on the basis of sorting conditions, which may include the feature of the packet, and identification information of the virtual port of the source of the packet, and outputs a message incorporating the packet and an output instruction to the specified node device 20 and interface unit 22 to the node device control section 11. Also, when receiving a packet from the node device control section 11, the sorting section 12 refers to the sorting rules stored in the sorting rule storage section 13 to specify a virtual port suitable for the output destination, on the basis of sorting conditions, which may include the feature of the packet, identification information of the node device of the source, and identification information of the interface section and the like, and outputs the packet to the specified virtual port. In an actual implementation, the sorting section 12 may be attained by installing an existing virtual machine monitor (VMM), a hypervisor or the like with the above-described functions.

The sorting rule storage section 13 stores the sorting rules of packets exchanged between the virtual ports in the controller 10 and the interface units in the respective node devices 20. Here, the sorting rule storage section 13 stores information required to sort packets as the sorting rules. The sorting rule storage section 13 returns and provides suitable sorting rules in response to a reference request from the node device control section 11 and the sorting section 12. For example, the sorting rule storage section 13 stores information which correlates virtual ports with interface units in a one-to-one relationship; and information which correlates features of packets (source and destination addresses, the kind of packets and the like) with virtual ports and interface units in a one-to-one relationship. The sorting rule storage section 13 may be attained by using a RDB (relational data base). It should be noted that the relations described in the sorting rules may be arbitrarily modified in accordance with the OS (Operation System), software and the like used in the computer which operates as the controller 10, or may be manually modified in accordance with a user operation. For example, the relations described in the sorting rules may be dynamically modified as a part of the QoS control. It should be noted, however, these are merely examples and an actual implementation is not limited to these examples.

The virtual ports 14 are each a virtual network interface provided in the controller 10. The virtual ports 14 are recognized as an entity equivalent to a physical network interface or treated in the same way as a physical network interface, by the OS (operating system) of the computer operating as the controller 10 and the like. This implies that the virtual ports 14 are each capable of transmitting and receiving packets. For example, the virtual ports 14 may be implemented as a virtual device, such as a TUN/TAP installed in the OS (Operating System) or other software. Also, individual virtual machines (VM) operating on the controller 10 may each contain an OS (Operating System) and a virtual port 14. It should be noted, however, an actual implementation is not limited to these examples The interface management section 15 manages the network interface in the controller 10. Here, the interface management section 15 is connected to the virtual ports 14 and capable of communicating with the virtual ports 14.

In this embodiment, the node device control section 11 is connected to the sorting section 12, the sorting rule storage section 13 and the interface management section 15.

It should be noted the interface management section 15 may be connected to any of the node devices 20 via a data communication link, similarly to the first embodiment.

(Configuration of Node Device Control Section)

An exemplary configuration of the node device control section 11 of this embodiment will be described below.

In this embodiment, the configuration of the node device control section 11 is basically identical to that of the first embodiment.

Figure 3:
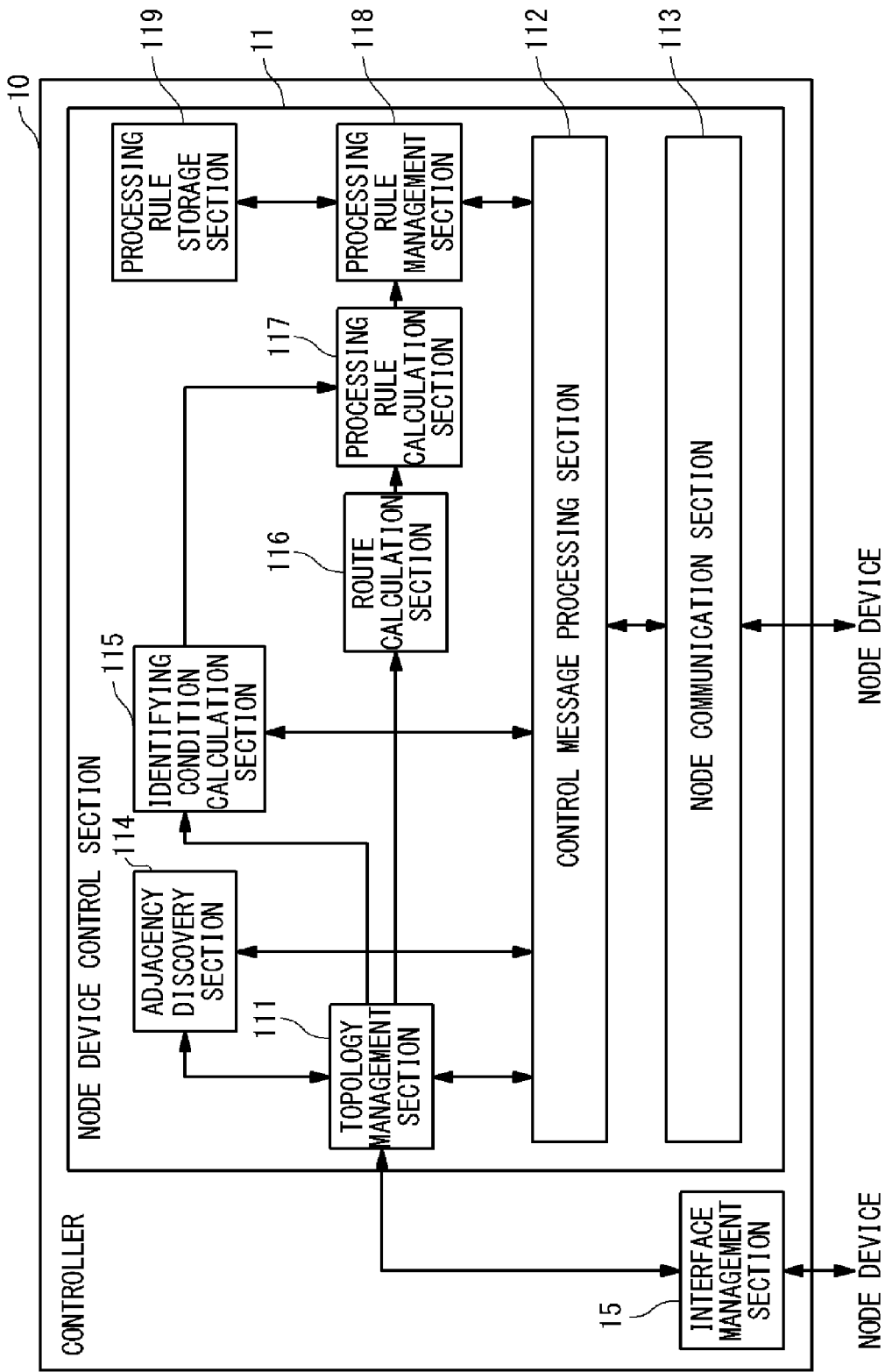
FIG. 3 shows an exemplary configuration of a controller.

The node device control section 11 includes a topology management section 111, a control message processing section 112, a node communication section 113, an adjacency discovery section 114, an identifying condition calculation section 115, a route calculation section 116, a processing rule calculation section 117, a processing rule management section 118 and a processing rule storage section 119, similarly to that shown in FIG. 3.

The topology management section 111, the control message processing section 112, the node communication section 113, the adjacency discovery section 114, the identifying condition calculation section 115, the route calculation section 116, the processing rule calculation section 117, the processing rule management section 118 and the processing rule storage section 119 basically operate similarly to those of the first embodiment.

It should be noted, however that, in this embodiment, the control message processing section 112 is further connected to the sorting section 12 and the sorting rule storage section 13.

(Operation of Topology Retrieval in Third Embodiment)

In one operation example, the topology retrieval in this embodiment is basically achieved in the procedure similar to that of the first embodiment or the second embodiment.

For example, the operation of the topology retrieval of this embodiment may involve the operations described in the sections entitled "(1) Operation for Transmitting LLDP Frame", "(2) Operation for Transmitting Inquiry Information of LLDP Frame via Control Channel", and "(4) Operation for Preparing Topology Information"; these sections describe the exemplary operation of the topology retrieval in the first embodiment.

This allows each controller 10 to dynamically recognize and monitor existences of a controller 10 in a different network, a node device 20 located on the boundary with the different network, and its interface unit 22.

(Operation for Setting Processing Rule in Third Embodiment)

An exemplary operation of setting processing rules (or flow entries) in the third embodiment is described below.

The identifying condition calculation section 115 in each of the controllers 10-1 and 10-2 calculates identifying conditions (or rules) of packets used to communicate with the controller 10 in a different network, on the basis of the topology information and the boundary information of the network, which are stored in the topology management section 111.

The route calculation section 116 in each of the controllers 10-1 and 10-2 determines the end points of a route used in the communication, on the basis of the topology information and the boundary information of the network, which are stored in the topology management section 111.

Here, each end point of the route is defined as a node device located on the boundary with a different network. In the network 1, the node device 20-3 is defined as one end point. In the network 2, the node device 20-4 is defined as the other end point.

The route calculation section 116 in each of the controllers 10-1 and 10-2 calculates the route which connects the controller 10 to the node device 20 located on the boundary with a different network and through the control channel.

The processing rule calculation section 117 in each of the controllers 10-1 and 10-2 obtains the route used for packet transfer from the route calculation section 116 and obtains the identifying conditions (or the identifying rules) of packets transferred on the route from the identifying condition calculation section 115.

The processing rule calculation section 117 in each of the controllers 10-1 and 10-2 uses the obtained information and calculates processing rules (or flow entries) to be set to the node device 20 located on the boundary with the different network. At this time, the processing rule calculation section 117 incorporates identification information (or the processing rule ID) of each processing rule (flow entry), into each processing rule (or flow entry). Specifically, the processing rule ID is stored in a cookie region in each processing rule (or flow entry). Also, contents of processing (or the actions) of the processing rules (or the flow entries) are defined to instruct an operation in which, when receiving a packet addressed to the controller 10 in its own network from the controller 10 in a different network, a packet-in message incorporating the packet and the processing rule ID is transmitted to the controller 10 in its own network through the control channel.

For example, the processing rule calculation section 117 in the controller 10-1 calculates processing rules (or flow entries) which instruct to, when receiving a packet addressed to the controller 10-1 from the controller 10-2, transmit a packet-in message incorporating the packet and a processing rule ID "A" to the controller 10-1 via the control channel, as the processing rules (or the flow entries) to be set to the node device 20-3.

Similarly, the processing rule calculation section 117 in the controller 10-2 calculates processing rules (or flow entries) which instruct to, when receiving a packet addressed to the controller 10-2 from the controller 10-1, transmit a packet-in message incorporating the packet and a processing rule ID "B" to the controller 10-2 via the control channel, as the processing rules (or the flow entries) to be set to the node device 20-4.

The processing rule management section 118 in each of the controllers 10-1 and 10-2 registers information related to the processing rules (or the flow entries) calculated by the processing rule calculation section 117 into the processing rule storage section 119, and requests the control message processing section 112 to set the node device 20 located on the boundary with the different network with the processing rules (or the flow entries).

The control message processing section 112 in each of the controllers 10-1 and 10-2, upon receiving the request for setting the node device 20 with the processing rules (or the flow entries), prepares a flow modification message (FlowMod-Add) to register the processing rules (or the flow entries) in the node device 20. The control message processing section 112 then requests the node communication section 113 to transmit the flow modification message (FlowMod-Add) to the node device 20 located on the boundary with the different network.

The node communication section 113 in each of the controllers 10-1 and 10-2, upon receiving the transmission request of the flow modification message (FlowMod-Add) to the node device 20 located on the boundary with the different network, transmits the flow modification message (FlowMod-Add) to the node device 20 via the control channel.

The communication unit 21 in each node device 20, upon receiving the flow modification message (FlowMod-Add) from the controller 10 via the control channel, registers therein the processing rules (or the flow entries) on the basis of the contents of the flow modification message (FlowMod-Add).

Hereafter, the communication unit 21, upon receiving a packet via the interface unit 22, processes the packet in accordance with the contents of the registered processing rules (or the flow entries).

(Operation for Notifying Processing Rules between Controllers in Third Embodiment)

An exemplary operation for notifying processing rules (flow entries) between the controllers 10 in the third embodiment is described below.

The control message processing section 112 in each of the controllers 10-1 and 10-2 obtains the processing rules (the flow entries) with regard to the communications between the controllers 10 from the processing rule management section 118, and obtains the processing rules ID embedded in the processing rules (the flow entries). The control message processing section 112 then prepares a notification packet incorporating the processing rules ID. For example, the control message processing section 112 in each of the controllers 10-1 and 10-2 incorporates the processing rules ID in the cookie region or data region of the notification packet. When preparing the notification packet, the control message processing section 112 defines the destination address as the address of the controller 10 in the different network, and defines the source address as the address of the controller 10 in its own network. It should be noted that, the control message processing section 112, may carry out this process at the same time, when preparing the flow modification message (FlowMod-Add).

The control message processing section 112 in each of the controllers 10-1 and 10-2 prepares a packet-out message which incorporates the above-described notification packet and a transmission instruction thereof.

The control message processing section 112 in each of the controllers 10-1 and 10-2 requests the node communication section 113 to transmit the packet-out message to the node device 20 located on the boundary with the different network.

The node communication section 113 in each of the controllers 10-1 and 10-2, when receiving the transmission request of the packet-out message to the node device 20 located on the boundary with the different network, transmits the packet-out message to the node device 20 via the control channel. For example, the node communication section 113 in the controller 10-1 transmits the packet-out message to the node device 20-3. Similarly, the node communication section 113 in the controller 10-2 transmits the packet-out message to the node device 20-4.

When receiving the packet-out message from the controller 10 via the control channel, the communication unit 21 in the node device 20 located on the boundary with the different network transmits the notification packet from the interface unit 22 to the node device 20 in the different network on the basis of the contents of the packet-out message. For example, the communication unit 21 in the node device 20-3 transmits the notification packet to the node device 20-4 via the data communication link. Similarly, the communication unit 21 in the node device 20-4 transmits the notification packet to the node device 20-3 via the data communication link.

Also, the communication unit 21 in the node device 20 located on the boundary with the different network, when receiving a notification packet from the node device 20 in the different network through the interface unit 22, transmits a packet-in message which incorporates the notification packet as inquiry information to the controller 10 that controls the node device 20 via the control channel. When receiving the notification packet from the node device 20-4, for example, the communication unit 21 in the node device 20-3 transmits a packet-in message which incorporates the notification packet to the controller 10-1 via the control channel. Similarly, when receiving a notification packet from the node device 20-3, the communication unit 21 in the node device 20-4 transmits a packet-in message which incorporates the notification packet to the controller 10-2 via the control channel.

The node communication section 113 in each of the controllers 10-1 and 10-2 receives the above-described packet-in message from the node device 20 located on the boundary with the different network via the control channel, and outputs the packet-in message to the control message processing section 112.

The control message processing section 112 in each of the controllers 10-1 and 10-2 extracts the notification packet stored in the above packet-in message, and obtains the processing rules ID that indicates the processing rules (flow entries) of the controller 10 in the different network from the contents of the notification packet.

For example, the controller 10-1 recognizes that a processing rule identified by a processing rule ID "B" is used in the controller 10-2 when transmitting a packet in which the destination address is defined as the address of the controller 10-2 and the source address is defined as the address of the controller 10-1. Similarly, the controller 10-2 recognizes that a processing rule identified by a processing rule ID "A" is used in the controller 10-1, when transmitting a packet in which the destination address is defined as the address of the controller 10-1 and the source address is defined as the controller 10-2.

(Operation for Setting Sorting Rule in Third Embodiment)

An exemplary operation for setting the sorting rules in the third embodiment is described below.

When receiving a setting request of processing rules (flow entries) to the node device 20 located on the boundary with the different network from the processing rule management section 118, the control message processing section 112 in each of the controllers 10-1 and 10-2 prepares a sorting rule and stores the prepared sorting rule in the sorting rule storage section 13.

At this time, the control message processing section 112 in each of the controllers 10-1 and 10-2 specifies identification information (the node device ID) of the node device 20 located on the boundary with the different network as information to be stored in a "node device ID" region in the sorting rule. The control message processing section 112 also specifies identification information (or the interface ID) of the interface unit 22 used for the connection to the node device 20 in the different network as information to be stored in an "interface ID" region of the sorting rule. The control message processing section 112 also specifies the address of the controller 10 in its own network as information to be stored in an "own address" region of the sorting rule. The control message processing section 112 also specifies the address of the controller 10 in the different network as information of a "counterpart address" region of the sorting rule. The control message processing section 112 specifies the processing rules ID embedded in the processing rule (or the flow entry) as information to be stored in a "processing rule ID" region of the sorting rule.

Also, the sorting section 12 in each of the controllers 10-1 and 10-2 recognizes a virtual port 14 used to communicate with the controller 10 in the different network, and specifies identification information of the virtual port (or the virtual port ID) as information to be stored in a "virtual port ID" region for the above-described sorting rule.

It should be noted that the setting method of the sorting rules is not limited to this method. For example, sorting rules may be manually stored in the sorting rule storage section 13 in advance by an operator's input or the like.

(Configuration of Sorting Rule)

An exemplary format of the sorting rules stored in the sorting rule storage section 13 is described with reference to FIGS. 9A and 9B.

A sorting rule includes a "virtual port ID" region, a "node device ID" region, an "interface ID" region, an "own address" region, a "counterpart address" region and a "processing rule ID" region.

The "virtual port ID" region contains identification information (or the virtual port ID) of the virtual port 14 used to communicate with the controller 10 in a different network.

The "node device ID" region contains identification information (or the node device ID) of the node device 20 located on the boundary with the different network.

The "interface ID" region contains identification information (or the interface ID) of the interface unit 22 used for the connection to the node device 20 in the different network.

The "own address" region contains the address of its own controller 10.

The "counterpart address" region contains the address of a communication counterpart.

The "processing rule ID" region contains identification information (or the processing rule ID) of a processing rule (or a flow entry).

(Supplement)

The above-described addresses may be a MAC address, an IP address, or other identification information.

Each of the addresses described in the "own address" region and the "counterpart address" region may be a destination address or a source address. When a case that the source address of a packet transferred between the controllers 10 is the address described in the "own address" region of a sorting rule and the destination address is the address described in the "counterpart address" region of the sorting rule, for example, this implies that the packet matches with the sorting rule. Also, when a case that the source address of a packet transferred between the controllers 10 is the address described in the "counterpart address" region of a sorting rule and the destination address is the address described in the "own address" region of the sorting rule, this implies that the packet matches with the sorting rule.

In this embodiment, it is assumed that an "own address" region contains the address of the controller 10 in its own network, and a "counterpart address" region contains the address of a controller 10 in a different network. Moreover, it is assumed that the virtual ports 14 are assigned with addresses in each controller 10. For example, a typical virtual machine (VM) may be assigned with a virtual MAC address, a virtual IP address or the like.

(Identification Information of Virtual Port and Interface Unit in Third Embodiment)

Here, a virtual port 14 in the controller 10-1 is assigned with a virtual port ID "VP1". A virtual port 14 in the controller 10-2 is assigned with a virtual port ID "VP2". The interface unit 22 used for the connection to the node device 20-4 in the node device 20-3 is assigned with an interface ID "IF3". The interface unit 22 used for the connection to the node device 20-3 in the node device 20-4 is assigned with an interface ID "IF4".

(Sorting Rule in Controller in Network 1)

FIG. 9A describes an example of the sorting rule in the controller 10-1 in the network 1.

(1) Sorting Rule that Uses Control Channel
Virtual port ID: VP1
Node device ID: DPID3
Interface ID": IF3
Own address: address of controller 10-1
Counterpart address: address of controller 10-2
Processing rule ID: A (Sorting Rule in Controller in Network 2)

FIG. 9B describes an example of a sorting rule in the controller 10-2 in the network 2.

(1) Sorting Rule That Uses Control Channel
Virtual port ID: VP2
Node device ID: DPID4
Interface ID: IF4
Own address: address of controller 10-2
Counterpart address: address of controller 10-1
Processing rule ID: B (Operation of Packet Transfer between Controllers in Third Embodiment)

An exemplary operation for packet transfer between the controllers 10 in the third embodiment is described below.

The sorting section 12 in each of the controllers 10-1 and 10-2, when receiving a packet from a virtual port 14, determines identification information (or the virtual port ID) of the virtual port 14, the destination address and the source address of the received packet.

The sorting section 12 in each of the controllers 10-1 and 10-2 searches the sorting rules stored in the sorting rule storage section 13, using the identification information (virtual port ID) of the virtual port 14, the destination address and the source address as search keys, to specify a node device 20 and an interface unit 22 which are suitable as the output destination of the packet.

For example, the sorting section 12 in the controller 10-1 searches the sorting rules stored in the sorting rule storage section 13, using the virtual port ID "VP1" of the virtual port 14, the destination address (that is, the address of the controller 10-2), the source address (that is, the address of the controller 10-1) as search keys, and consequently specifies the node device ID "DPID3" and the interface ID "IF3".

Similarly, the sorting section 12 in the controller 10-2 searches the sorting rules stored in the sorting rule storage section 13 using the virtual port ID "VP2" of the virtual port 14, the destination address (that is, the address of the controller 10-1) and the source address (that is, the address of the controller 10-2) as search keys, and consequently specifies the node device ID "DPID4" and the interface ID "IF4".

The sorting section 12 in each of the controllers 10-1 and 10-2 outputs a message incorporating the packet and an instruction to output the packet to the specified node device 20 and interface unit 22, to the control message processing section 112 in the node device control section 11.

For example, the sorting section 12 in the controller 10-1 outputs a message incorporating the packet and an instruction to output the packet to the node device 20-3 and the specified interface unit 22 thereof, to the control message processing section 112 in the node device control section 11.

Similarly, the sorting section 12 in the controller 10-2 outputs a message incorporating the packet and an instruction to output the packet to the node device 20-4 and the specified interface unit 22 thereof, to the control message processing section 112 in the node device control section 11.

The control message processing section 112 in each of the controllers 10-1 and 10-2 refers to the sorting rules stored in the sorting rule storage section 13 to prepare a packet-out message incorporating the packet and an instruction to transmit the packet, and requests the node communication section 113 to transmit the packet-out message to the node device 20 located on the boundary with the different network.

The node communication section 113 in each of the controllers 10-1 and 10-2 transmits the packet-out message received from the control message processing section 112 to the node device 20 located on the boundary with the different network.

For example, the node communication section 113 in the controller 10-1 transmits the packet-out message from the control message processing section 112 to the node device 20-3.

Similarly, the node communication section 113 in the controller 10-2 transmits the packet-out message from the control message processing section 112 to the node device 20-4.

The communication unit 21 in the node device 20 located on the boundary with the different network transmits the packet incorporated in the above-described packet-out message from the specified interface unit 22 to the node device 20 in the different network.

For example, the communication unit 21 in the node device 20-3 transmits the packet incorporated in the above-described packet-out message from the specified interface unit 22 to the node device 20-4.

Similarly, the communication unit 21 in the node device 20-4 transmits the packet incorporated in the above packet-out message from the specified interface unit 22 to the node device 20-4.

Also, the communication unit 21 in the node device 20 located on the boundary with the different network, when receiving the packet from the node device 20 in the different network through the interface unit 22, transmits a packet-in message as inquiry information to the controller 10 that controls the its own node device 20 via the control channel in accordance with the processing rules (or the flow entries). At this time, the communication unit 21 incorporates the packet, the node device ID, the interface ID and the processing rule ID into this packet-in message.

For example, the communication unit 21 in the node device 20-3, when receiving a packet from the node device 20-4 via the interface unit 22, transmits a packet-in message as inquiry information to the controller 10-1 that controls the node device 20-3 via the control channel in accordance with the processing rules (or the flow entries). At this time, the communication unit 21 in the node device 20-3 incorporates the packet, the node device ID "DPID3", the interface ID "IF3" and the processing rule ID "A", into this packet-in message.

Similarly, the communication unit 21 in the node device 20-4, when receiving a packet from the node device 20-3 via the interface unit 22, transmits a packet-in message as inquiry information to the controller 10-2 that controls the node device 20-4 via the control channel in accordance with the processing rules (or the flow entries). At this time, the communication unit 21 in the node device 20-4 incorporates the packet, the node device ID "DPID4", the interface ID "IF4" and the processing rule ID "B", into this packet-in message.

The node communication section 113 in each of the controllers 10-1 and 10-2 receives the above-described packet-in message from the node device 20 connected thereto via the control channel, and outputs the packet-in message to the control message processing section 112.

The control message processing section 112 in each of the controllers 10-1 and 10-2 analyzes the above-described packet-in message and obtains the packet, the node device ID, the interface ID and the processing rule ID. At this time, the control message processing section 112 can obtain the destination address and the source address from the header information of the packet and the like.

For example, the control message processing section 112 in the controller 10-1 analyzes the above-described packet-in message and obtains the packet, the node device ID "DPID3", the interface ID "IF3" and the processing rule ID "A". At this time, the control message processing section 112 can obtains the address of the controller 10-1 as the destination address and the address of the controller 10-2 as the source address from the header information of the packet, and the like.

Similarly, the control message processing section 112 in the controller 10-2 analyzes the above-described packet-in message and obtains the packet, the node device ID "DPID4", the interface ID "IF4" and the processing rule ID "B". At this time, the control message processing section 112 can obtains the address of the controller 10-2 as the destination address and the address of the controller 10-1 as the source address from the header information of the packet, and the like.

The control message processing section 112 in each of the controller 10-1 and 10-2 searches the sorting rules stored in the sorting rule storage section 13 by using at least one of the node device ID, the interface ID, the destination address, the source address and the processing rule ID as a search key(s), and recognizes that the packet is addressed to a virtual port 14 in its own network. The control message processing section 112 then outputs the packet to the sorting section 12 together with the information used as the search key(s). At this time, the control message processing section 112 may output any or all of the node device ID, the interface ID, the destination address, the source address and the processing rule ID together with the packet, to the sorting section 12.

The sorting section 12 in each of the controllers 10-1 and 10-2 searches the sorting rules stored in the sorting rule storage section 13 using at least one of the node device ID, the interface ID, the destination address, the source address and the processing rule ID as a search key(s), and thereby recognizes that the packet is addressed to a virtual port 14 in the controller 10 in its own network, and then outputs the packet to the virtual port 14.

For example, the sorting section 12 in the controller 10-1 searches the sorting rules stored in the sorting rule storage section 13 using the processing rule ID "A" as a search key, and thereby specifies the virtual port ID "VP1". The sorting section 12 in the controller 10-1 then outputs the packet to the virtual port 14 identified by the virtual port ID "VP1".

Similarly, the sorting section 12 in the controller 10-2 searches the sorting rules stored in the sorting rule storage section 13 by using the processing rule ID "B" as a search key, and thereby specifies the virtual port ID "VP2". The sorting section 12 in the controller 10-2 then outputs the packet to the virtual port 14 identified by the virtual port ID "VP2".

(Supplement)

When searching the sorting rules stored in the sorting rule storage section 13 using at least one of the node device ID, the interface ID, the destination address, the source address and the processing rule ID as a search key(s), the control message processing section 112 and the sorting section 12 may use any one of the node device ID, the interface ID, the destination address, the source address and the processing rule ID, or any combination of them, or all of them as the search key(s).

It should be noted that the sorting section 12 may unconditionally specify the interface unit 22 in the node device 20 located on the boundary with the different network as the output destination of the packet inputted from a predetermined virtual port 14. Similarly, the sorting section 12 may unconditionally specify a predetermined virtual port 14, as the output destination of the packet from the interface unit 22 in the node device 20 located on the boundary with the different network.

For example, when receiving a packet from a virtual port 14, the sorting section 12 may search the sorting rules stored in the sorting rule storage section 13 using only the virtual port ID as the search key, irrespectively of the destination address and the source address of the inputted packet and specify a node device ID and an interface ID which indicate the output destination. When receiving a packet from the control message processing section 112, on the other hand, the sorting section 12 may search the sorting rules stored in the sorting rule storage section 13 using only the node device ID and the interface ID as the search keys and specify a virtual port ID which indicates the output destination.

This embodiment eliminates the need for physically connecting interfaces of a controller and a node device via a data communication link, effectively improving the flexibility in actual implementations.

<Fourth Embodiment>

A fourth embodiment of the present invention is described below.

In this embodiment, which is based on the third embodiment, client processes are executed in one of the two controllers, and server processes are executed in the other controller. At this time, the two controllers communicate with each other via the node devices under the control thereof.

(Configuration of Communication System in Fourth Embodiment)

Figure 10A:
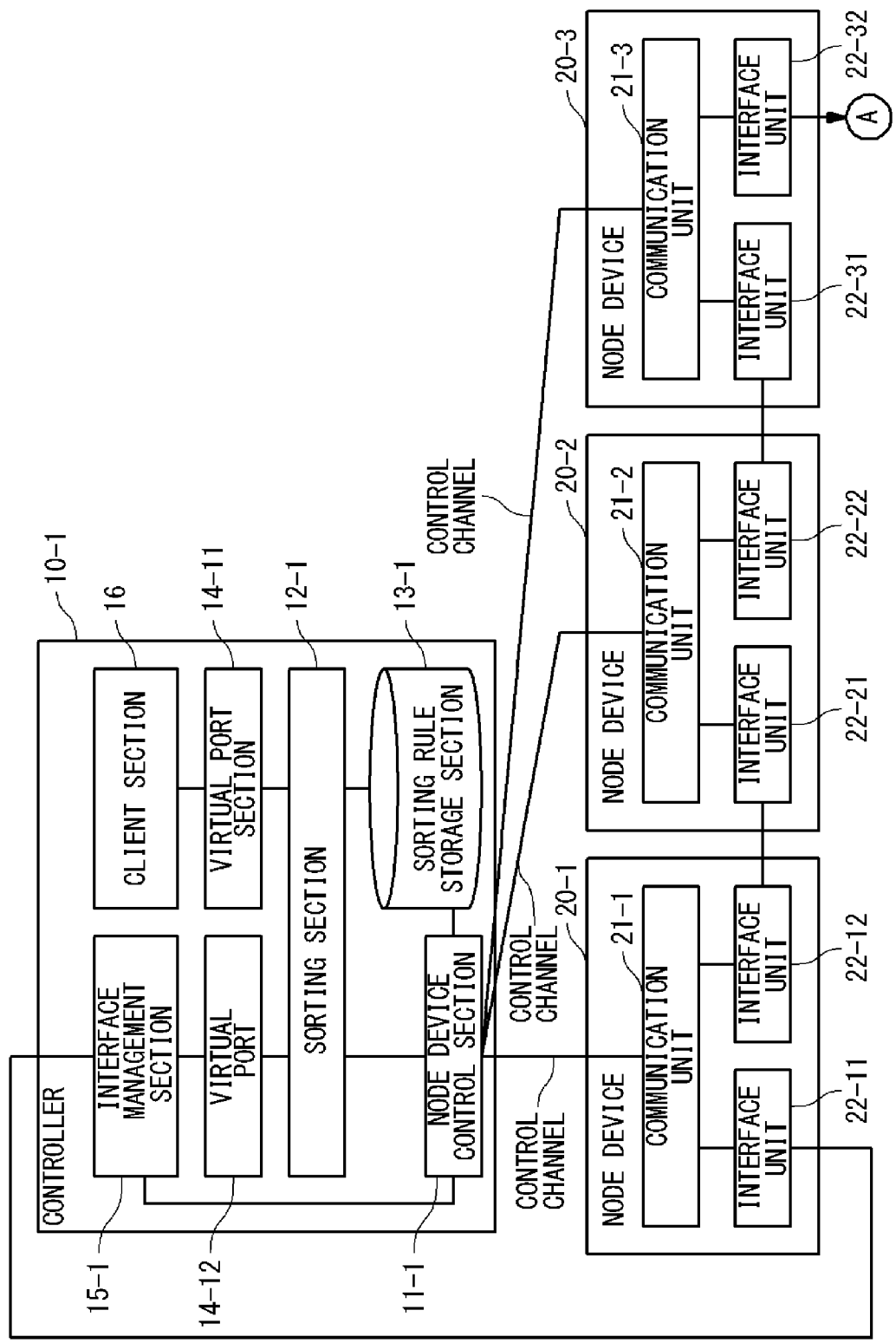
FIG. 10A shows an exemplary configuration of the first network of the communications system in a fourth embodiment.
Figure 10B:
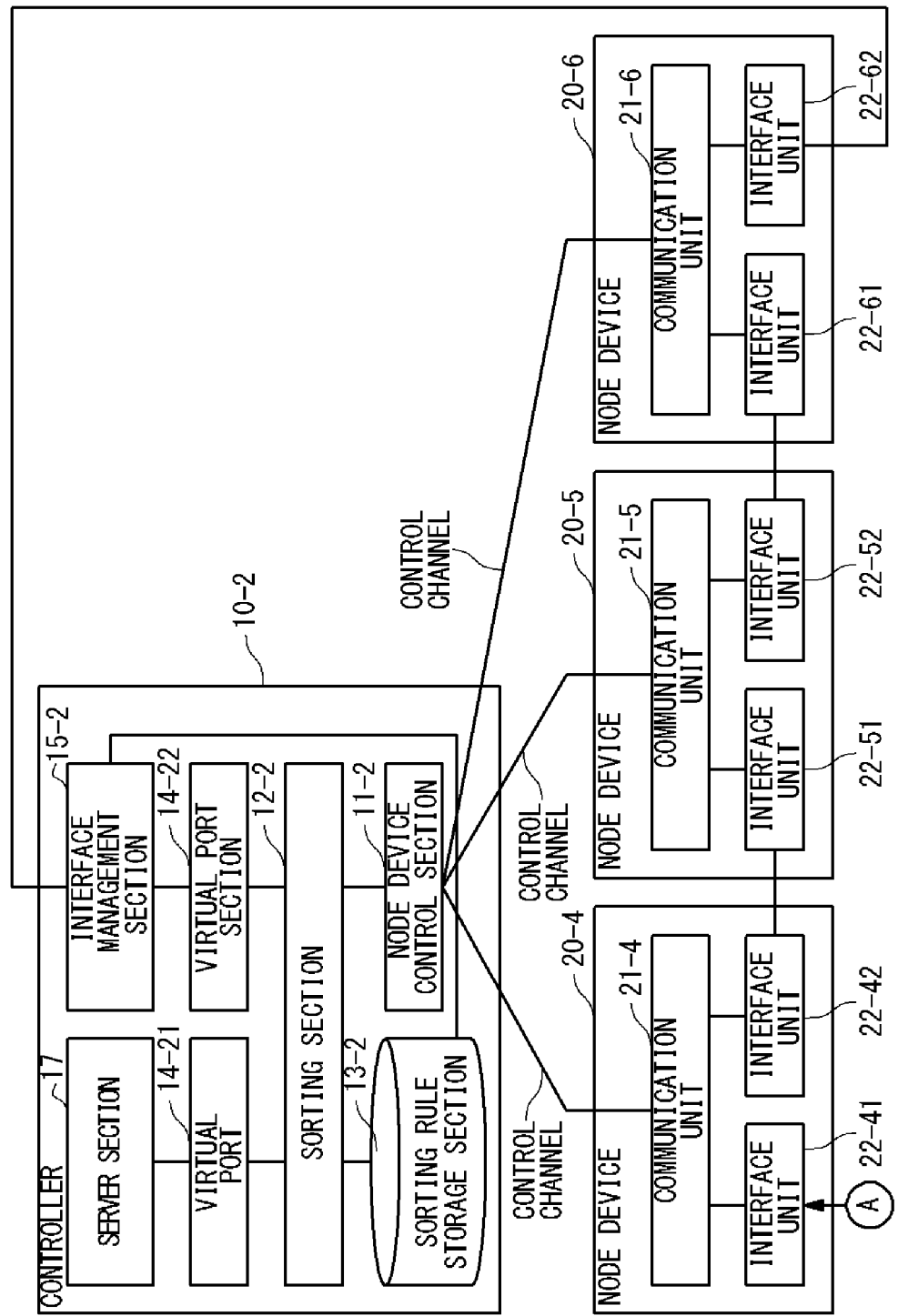
FIG. 10B shows an exemplary configuration of the second network of the communications system in the fourth embodiment.

An exemplary configuration of the communications system of this embodiment is described with reference to FIGS. 10A and 10B. It should be noted that FIG. 10A shows an exemplary network configuration of the network 1 and FIG. 10B shows an exemplary network configuration of the network 2.

The communications system of this embodiment includes a controller 10-1, a controller 10-2, node devices 20-1 to 20-6.

The controller 10-1 controls the node devices 20-1 to 20-3 and the controller 10-2 controls the node devices 20-4 to 20-6.

The node devices 20-1 to 20-3 are arranged in the network 1 and the node devices 20-4 to 20-6 are arranged in the network 2. At least one of the node devices 20-1 to 20-3 is connected to at least one of the node devices 20-4 to 20-6 via a data communication link.

(Configuration of Controller according to Fourth Embodiment)

Exemplary configurations of the controller 10-1 and the controller 10-2 are described below.

Figure 8:
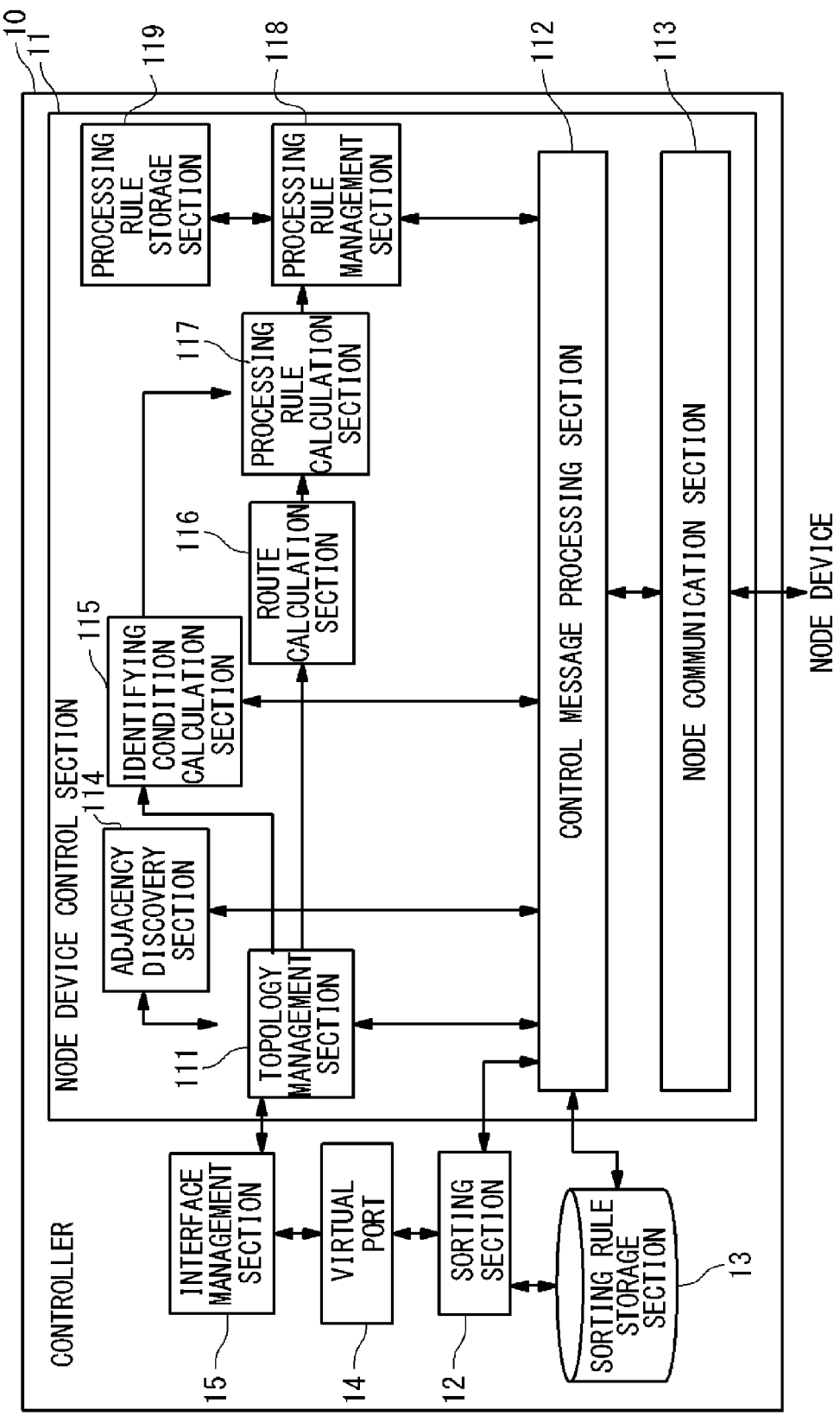
FIG. 8 shows an exemplary configuration of a controller in a third embodiment.

The controllers 10-1 and 10-2 each correspond to the controller 10 shown in FIG. 8.

The controller 10-1 includes a node device control section 11-1, a sorting section 12-1, a sorting rule storage section 13-1, virtual ports 14-11 and 14-12, an interface management section 15-1 and a client section 16.

The controller 10-2 contains a node device control section 11-2, a sorting section 12-2, a sorting rule storage section 13-2, virtual ports 14-21 and 14-22, an interface management section 15-2 and a server section 17.

The node device control section 11-1 and the node device control section 11-2 each correspond to the node device control section 11 shown in FIG. 8.

Here, the node device control section 11-1 controls each of the node devices 20-1 to 20-3 via a control channel.

Also, the node device control section 11-2 controls each of the node devices 20-4 to 20-6 via a control channel.

The sorting sections 12-1 and 12-2 each correspond to the sorting section 12 shown in FIG. 8.

The sorting rule storage sections 13-1 and 13-2 each correspond to the sorting rule storage section 13 shown in FIG. 8.

The virtual ports 14-11, 14-12, 14-21 and 14-22 each correspond to the virtual port 14 shown in FIG. 8.

The interface management sections 15-1 and 15-2 each correspond to the interface management section 15 shown in FIG. 8. It should be noted that the interface management sections 15-1 and 15-2 may have the same function as the interface management section 15 shown in FIG. 3.

The client section 16 executes processes in the seventh layer (the application layer or layer 7) out of the seven layers defined in the OSI reference model. The client section 16 may be realized by a client processing function provided by the OS (operating system) or software of the computer operating as the controller 10. Note that actual implementations of the client section 16 are not limited to those examples.

The server section 17 executes processes in the seventh layer (the application layer, layer 7) out of the seven layers defined in the OSI reference model. The server section 17 may be realized by a server processing function provided by the OS (operating system) or software of the computer operating as the controller 10. However, actual implementations of the server section 17 are not limited to those examples.

Is should be noted that each of the controllers 10-1 and 10-2 may incorporate both of the client section 16 and the server section 17.

(Connection Example of Virtual Port in Fourth Embodiment)

In this embodiment, the virtual port 14-11 in the controller 10-1 is assigned with an address "AD11". The virtual port 14-11 is provided between the sorting section 12-1 and the client section 16, allowing packet transfer between the sorting section 12-1 and the client section 16. Also, the virtual port 14-12 in the controller 10-1 is assigned with an address "AD12". The virtual port 14-11 and the client section 16 may be installed in the same virtual machine (VM). The virtual port 14-12 is provided between the sorting section 12-1 and the interface management section 15-1, allowing packet transfer between the sorting section 12-1 and the interface management section 15-1. In an actual implementation, the sorting section 12-1, the virtual ports 14-11, 14-12 and the interface management section 15-1 may be realized as the functions installed in the same OS (operating system) and software.

Similarly, the virtual port 14-21 in the controller 10-2 is assigned with an address "AD21". The virtual port 14-21 is arranged between the sorting section 12-2 and the server section 17, allowing packet transfer between the sorting section 12-2 and the server section 17. The virtual port 14-21 and the server section 17 may be installed in the same virtual machine (VM). Also, the virtual port 14-22 in the controller 10-2 is assigned with an address "AD22". The virtual port 14-22 is provided between the sorting section 12-2 and the interface management section 15-2, allowing packet transfer between the sorting section 12-2 and the interface management section 15-2. In an actual implementation, the sorting section 12-2, the virtual ports 14-21, 14-22 and the interface management section 15-2 may be realized as the functions installed in the same OS (Operating System) and software.

(Supplement)

Specifically, the above-described addresses "AD11" and "AD21" may be defined as any region (field) which can be identified in the OpenFlow technique, such as the MAC address, the IP address, the TCP/UDP (User Datagram Protocol) port number and the like, or a combination of them. It should be noted, however, actual implementations are not limited to these examples.

(Identification Information of Virtual Port in Fourth Embodiment)

The virtual port 14-11 in the controller 10-1 is assigned with a virtual port ID "VP11". The virtual port 14-12 in the controller 10-1 is assigned with a virtual port ID "VP12". The virtual port 14-21 in the controller 10-2 is assigned with a virtual port ID "VP21". The virtual port 14-22 in the controller 10-2 is assigned with a virtual port ID "VP22".

(Configuration of Node Device in Fourth Embodiment)

Exemplary configurations of the node devices 20-1 to 20-6 are described below.

Figure 4:
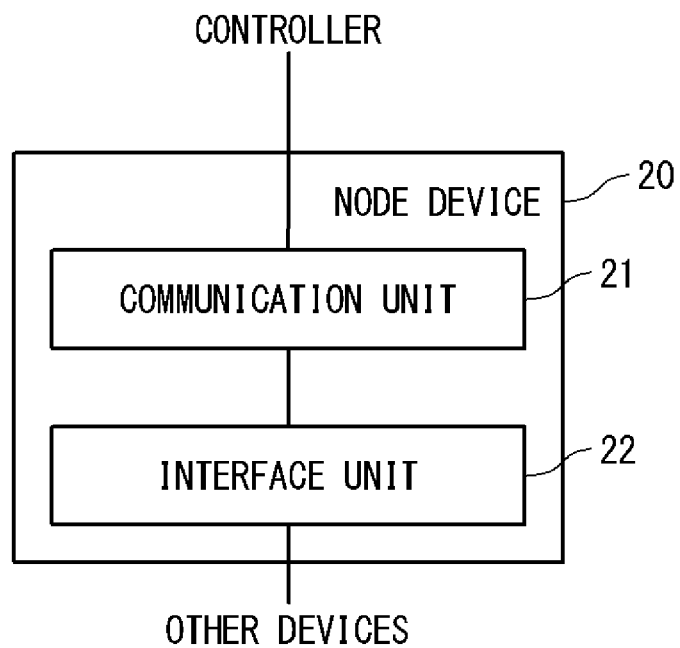
FIG. 4 shows an exemplary configuration example of a node device.

The node devices 20-1 to 20-6 each correspond to the node device 20 shown in FIG. 4.

The node device 20-1 includes a communication unit 21-1, an interface unit 22-11 and an interface unit 22-12. The node device 20-2 includes a communication unit 21-2, an interface unit 22-21 and an interface unit 22-22. The node device 20-3 includes a communication unit 21-3, an interface unit 22-31 and an interface unit 22-32. The node device 20-4 includes a communication unit 21-4, an interface unit 22-41 and an interface unit 22-42. The node device 20-5 includes a communication unit 21-5, an interface unit 22-51 and an interface unit 22-52. The node device 20-6 includes a communication unit 21-6, an interface unit 22-61 and an interface unit 22-62.

The communication unit 21-1 to 21-6 each correspond to the communication unit 21 shown in FIG. 4.

The interface units 22-11, 22-12, 22-21, 22-22, 22-31, 22-32, 22-41, 22-42, 22-51, 22-52, 22-61 and 22-62 each correspond to the interface units 22 shown in FIG. 4.

(Connection Example of Interface Unit in Fourth Embodiment)

The interface unit 22-11 in the node device 20-1 is connected to the interface management section 15-1 in the controller 10-1. The interface unit 22-12 in the node device 20-1 is connected to the interface unit 22-21 in the node device 20-2. The interface unit 22-22 in the node device 20-2 is connected to the interface unit 22-31 in the node device 20-3. The interface unit 22-32 in the node device 20-3 is connected to the interface unit 22-41 in the node device 20-4. The interface unit 22-42 in the node device 20-4 is connected to the interface unit 22-51 in the node device 20-5. The interface unit 22-52 in the node device 20-5 is connected to the interface unit 22-61 in the node device 20-6. The interface unit 22-62 in the node device 20-6 is connected to the interface management section 15-2 in the controller 10-2.

The node device 20-3 is arranged in the network 1, and the node device 20-4 is arranged in the network 2. This implies that the interface unit 22-32 in the node device 20-3 and the interface unit 22-41 in the node device 20-4 each serve as an interface unit 22 located on the boundary with a different network.

(Identification Information of Interface Unit According to Fourth Embodiment)

The interface unit 22-11 is assigned with an interface ID "IF11". The interface unit 22-12 is assigned with an interface ID "IF12". The interface unit 22-21 is assigned with an interface ID "IF21". The interface unit 22-22 is assigned with an interface ID "IF22". The interface unit 22-31 is assigned with an interface ID "IF31". The interface unit 22-32 is assigned with an interface ID "IF32". The interface unit 22-41 is assigned with an interface ID "IF41". The interface unit 22-42 is assigned with an interface ID "IF42". The interface unit 22-51 is assigned with an interface ID "IF51". The interface unit 22-52 is assigned with an interface ID "IF52". The interface unit 22-61 is assigned with an interface ID "IF61". The interface unit 22-62 is assigned with an interface ID "IF62".

(Sorting Rule in Controller in Network 1)

FIG. 11A shows an example of the sorting rules in the controller 10-1 in the network 1.

(1) Sorting Rule which Uses Control Channel
Virtual port ID: VP11
Node device ID: DPID3
Interface ID: IF32
Own address: AD11
Counterpart address: AD21
Processing rule ID: A1

(2) Sorting Rule which Uses Data Communication Link
Virtual port ID: VP12
Node device ID: DPID1
Interface ID: IF11
Own address: AD12
Counterpart address: AD22
Processing rule ID: A2

(Sorting Rule in Controller in Network 2)

FIG. 11B shows an example of the sorting rules in the controller 10-2 in the network 2.

(1) Sorting Rule which Uses Control Channel
Virtual port ID: VP21
Node device ID: DPID4
Interface ID: IF41
Own address: AD21
Counterpart address: AD11
Processing rule ID: B1

(2) Sorting Rule which Uses Data Communication Link
Virtual port ID: VP22
Node device ID: DPID6
Interface ID: IF62
Own address: AD22
Counterpart address: AD12
Processing rule ID: A2

(Registration of Processing Rule (Flow Entry) to Node Device 20-3)

The node device control section 11-1 in the controller 10-1 searches the sorting rules stored in the sorting rule storage section 13-1 and outputs a flow modification message (FlowMod-Add) to set the node device 20-3 with a processing rule (or a flow entry). Here, the destination address "AD11" and the source address "AD21" are specified as the identifying conditions (or the identifying rule) of the processing rule (or the flow entry). Also, the contents of processing (or the action) of the processing rule (flow entry) are specified to perform an operation of outputting a packet-in message incorporates the packet and the processing rule ID "A1" to the controller 10-1 (or the output port connected to the controller 10-1). That is, the node device control section 11-1 outputs to the node device 20-3 a flow modification message (FlowMod-Add) to instruct the node device 20-3 to carry out a process of outputting to the controller 10-1 the packet-in message which incorporates the packet and the processing rule ID "A1", when the interface unit 22-32 receives the packet in which the destination address is "AD11" and the source address is "AD21".

(Registration of Processing Rule (Flow Entry) to Node Device 20-4)

The node device control section 11-2 in the controller 10-2 searches the sorting rules stored in the sorting rule storage section 13-2, and outputs a flow modification message (FlowMod-Add) to set the node device 20-4 with a processing rule (or a flow entry). Here, the destination address "AD21" and the source address "AD11" are specified as identifying conditions (or an identifying rule) of the processing rule (or the flow entry). Also, the contents of processing (or the action) of the processing rule (or the flow entry) are specified to perform an operation of outputting an packet-in message incorporates the packet and the processing rule ID "B1" to the controller 10-2 (or the output port connected to the controller 10-2). That is, the node device control section 11-2 outputs to the node device 20-4 a flow modification message (FlowMod-Add) to instruct the node device 20-4 to carry out a process of outputting to the controller 10-2 the packet-in message which incorporates the packet and the processing rule ID "B1", when the interface unit 22-23 receives the packet in which the destination address is "AD21" and the transmission source address is "AD11".

(Packet Output Instruction to Node Device 20-3)

When receiving a packet from the virtual port 14-11, the sorting section 12-1 in the controller 10-1, searches the sorting rules stored in the sorting rule storage section 13-1, and if the destination address of the packet is "AD21" and the source address of the packet is "AD11", outputs a message of requesting the node device control section 11-1 to output the packet from the interface unit 22-32 in the node device 20-3.

When receiving the above-described message from the sorting section 12-1, the node device control section 11-1 transmits a packet-out message which incorporates the packet and a instruction of outputting the packet to the interface unit 22-12, to the node device 20-3 via the control channel.

(Packet Output Instruction to Node Device 20-4)

When receiving a packet from the virtual port 14-21, the sorting section 12-2 in the controller 10-2, searches the sorting rules stored in the sorting rule storage section 13-2, and if the destination address of the packet is "AD11" and the source address of the packet is "AD21", outputs a message of requesting the node device control section 11-2 to output the packet from the interface unit 22-41 in the node device 20-4.

(Operation for Transferring Packet to Server Section from Client Section)

An exemplary operation for transferring a packet to the server section 17 from the client section 16 is described below.

The client section 16 in the controller 10-1 outputs a packet in which the destination address is defined as "AD21" and the source address is defined as "AD11", to the virtual port 14-11.

When receiving the packet from the client section 16, the virtual port 14-11 outputs the packet to the sorting section 12-1.

When receiving the packet from the virtual port 14-11, the sorting section 12-1 searches the sorting rules stored in the sorting rule storage section 13-1 and outputs a message of requesting the node device control section 11-1 to output the packet from the interface unit 22-32 in the node device 20-3, since the destination address of the packet is "AD21" and the source address of the packet is "AD11".

When receiving the above-described message from the sorting section 12-1, the node device control section 11-1 transmits a packet-out message which incorporates the packet and an instruction of outputting the packet to the interface unit 22-32, to the communication unit 21-3 in the node device 20-3.

When receiving the packet-out message from the node device control section 11-1 in the controller 10-1, the communication unit 21-3 in the node device 20-3 outputs the packet incorporated in the packet-out message to the interface unit 22-32.

When receiving the packet from the communication unit 21-3, the interface unit 22-32 transfers the packet to the interface unit 22-41 in the node device 20-4, which is the connection destination, via the data communication link.

When receiving the packet from the interface unit 22-32 in the node device 20-3, the interface unit 22-41 in the node device 20-4 outputs the packet to the communication unit 21-4.

When receiving the packet from the interface unit 22-41, the communication unit 21-4 processes the inputted packet in accordance with the processing rules (the flow entries).

In this embodiment, the communication unit 21-4 is set with a processing rule (or a flow entry) by the node device control section 11-2 in the controller 10-2, wherein the processing rule instructs to, when receiving a packet in which the destination address is "AD21" and the source address is ""AD11" in the interface unit 22-41, output a packet-in message which incorporates the packet and the processing rule ID "B1" to the controller 10-2.

Accordingly, the communication unit 21-4 outputs the packet-in message incorporating the packet, which complies with the identifying conditions (or the identifying rule) of the processing rule (or the flow entry), and the processing rule ID "B1", to the node device control section 11-2 in the controller 10-2, via the control channel.

When receiving the above-described packet-in message from the communication unit 21-4 in the node device 20-4, the node device control section 11-2 in the controller 10-2 outputs a message which incorporates the above-described packet and the processing rule ID "B1" to the sorting section 12-2.

When receiving the above message from the node device control section 11-2, the sorting section 12-2 searches the sorting rules stored in the sorting rule storage section 13-2, and determines that the packet is to be outputted to the virtual port 14-21 on the basis of the processing rule ID "B1" included in the above message, and outputs the packet incorporated in the above message to the virtual port 14-21.

When receiving the packet from the sorting section 12-2, the virtual port 14-21 outputs the packet to the server section 17, which is the connection destination thereof.

The server section 17 processes the packet when receiving the packet from the virtual port 14-21.

(Operation for Transferring Packet to Client Section from Server Section)

Next, an exemplary operation of transferring a packet from the server section 17 to the client section 16 is described below.

The server section 17 in the controller 10-2 outputs a packet in which the destination address is defined as "AD11" and the source address is defined as "AD21" to the virtual port 14-21.

When receiving the packet from the server section 17, the virtual port 14-21 outputs the packet to the sorting section 12-1.

When receiving the packet from the virtual port 14-21, the sorting section 12-1 searches the sorting rules stored in the sorting rule storage section 13-1. Since the destination address of the packet is "AD11" and the source address of the packet is "AD21", the sorting section 12-1 outputs a message of requesting the node device control section 11-2 to output the packet from the interface unit 22-41 in the node device 20-4.

When receiving the above message from the sorting section 12-2, the node device control section 11-2 transmits a packet-out message which incorporates the packet and an instruction of outputting the packet to the interface unit 22-41, to the communication unit 21-4 in the node device 20-4 via the control channel.

When receiving the packet-out message from the node device control section 11-2 in the controller 10-2, the communication unit 21-4 in the node device 20-4 outputs the packet incorporated in the packet-out message to the interface unit 22-41.

When receiving the packet from the communication unit 21-4, the interface unit 22-41 transfers the packet to the interface unit 22-32 in the node device 20-3, which is the connection destination, through the data communication link.

When receiving the packet from the interface unit 22-41 in the node device 20-4, the interface unit 22-32 in the node device 20-3 outputs the packet to the communication unit 21-3.

When receiving the packet from the interface unit 22-32, the communication unit 21-3 processes the received packet on the basis of the processing rules (or the flow entries).

Here, the communication unit 21-3 is set with a processing rule (or a flow entry) from the node device control section 11-1 in the controller 10-1, wherein the processing rule instructs to, when receiving a packet in which the destination address is defined as "AD11" and the source address is defined as "AD21" in the interface unit 22-32, output a packet-in message which incorporates the packet and the processing rule ID "A1" to the controller 10-1.

As a result, the communication unit 21-3 outputs the packet-in message which incorporates the packet complying with the identifying conditions (or the identifying rule) of the processing rule (or the flow entry) and the processing rule ID "A1", to the node device control section 11-1 in the controller 10-1 via the control channel.

When receiving the above packet-in message from the communication unit 21-3 in the node device 20-3, the node device control section 11-1 in the controller 10-1 outputs a message which incorporates the above packet and the processing rule ID "A1" to the sorting section 12-1.

When receiving the above message from the node device control section 11-1, the sorting section 12-1 searches the sorting rules stored in the sorting rule storage section 13-1, and determines that the packet is to be outputted to the virtual port 14-11 on the basis of the processing rule ID "A1" incorporated in the above message, and then outputs the packet incorporated in the above message to the virtual port 14-11.

When receiving the packet from the sorting section 12-1, the virtual port 14-11 outputs the packet to the client section 16, which is the connection destination.

The client section 16 processes the packet when receiving the packet from the virtual port 14-11.

(Communications via Data Communication Link)

In the fourth embodiment, communications between the controllers 10 can be carried out by packet transfer via a data communication link, similarly to the first embodiment.

(1) Setting of Processing Rules (Flow Entries) to Each Node Device 20

Initially, the node device control section 11 in each of the controllers 10-1 and 10-2 calculates a route to connect the end points in each network and sets each node device 20 on the route with processing rules (or flow entries) for the packet transfer.

For example, the node device control section 11-1 in the controller 10-1 calculates a route to connect the interface unit 22-11 in the node device 20-1 with the interface unit 22-32 in the node device 20-3 in the network 1 and sets each node device 20 on the route with processing rules (flow entries) for the packet transfer.

Similarly, the node device control section 11-2 in the controller 10-2 calculates a route to connect the interface unit 22-41 in the node device 20-4 to the interface unit 22-62 in the node device 20-6 in the network 2 and sets each node device 20 on the route with processing rules (flow entries) for the packet transfer.

(2) Transmission and Reception of Packet Through Link for Data Communication

The sorting section 12 in each of the controller 10-1 and the controller 10-2 then outputs a packet which is to be transferred through the data communication link to the virtual port 14 connected to the interface management section 15. Consequently, the packet is outputted from the interface management section 15. At this time, the sorting section 12 may refer to the sorting rule stored in the sorting rule storage section 13 and determine the virtual port 14 of the output destination.

For example, the sorting section 12-1 in the controller 10-1 outputs a packet in which the destination address is "AD22" and the source address is "AD12" to the virtual port 14-12. As a result the packet is outputted from the interface management section 15-1. In this case, the client section 16 in the controller 10-1 may output the packet in which the destination address is "AD22" and the transmission source address is AD12" via the virtual port 14-11 to the sorting section 12-1.

Similarly, the sorting section 12-2 in the controller 10-1 outputs a packet in which the destination address is "AD12" and the source address is "AD22" to the virtual port 14-22. As a result, the packet is outputted from the interface management section 15-2. In this case, the server section 17 in the controller 10-1 may output the packet in which the destination address is "AD12" and the source address is "AD22" via the virtual port 14-21 to the sorting section 12-2.

The communication unit 21 in each node device 20 transfers packets in accordance with the processing rules (or the flow entry).

The interface management section 15 in each of the controller 10-1 and the controller 10-2 outputs packets which are received from a node device 20 via a data communication link to the sorting section 12 via a virtual port 14.

For example, the interface management section 15-1 in the controller 10-1 outputs a packet received from the node device 20-1 to the sorting section 12-1 via the data communication link through the virtual port 14-12. In this case, the sorting section 12-1 in the controller 10-1 may output the packet received from the virtual port 14-12 to the client section 16, through the virtual port 14-11.

Similarly, the interface management section 15-2 in the controller 10-2 outputs a packet received from the node device 20-6 to the sorting section 12-2 via the data communication link through the virtual port 14-22. In this case, the sorting section 12-2 in the controller 10-2 may output the packet received from the virtual port 14-22 to the server section 17 through the virtual port 14-21.

(Supplement)

The sorting section 12 in each controller 10 may perform packet transfer between the virtual ports 14 in the controller 10 without referring to the sorting rules stored in the sorting rule storage section 13.

It should be noted that the sorting rule storage section 13 may store the sorting rules of packets exchanged among the virtual ports 14 in the controller 10.

When one of the controllers is used as a terminal device connected to the node device, this embodiment allows communications that uses a conventional communication method, such as TCP/IP and the like, between the terminal apparatus and the controller.

<Advantage of Communications Systems disclosed in Above-Described Embodiments>

Conventionally, there is a difficulty in achieving communications among controllers by using a conventional communication method such as TCP/IP in a CD-separated type network, such as OpenFlow networks. The use of the systems disclosed in these embodiments of the present invention enables communications based on a conventional communication method such as TCP/IP between or among a plurality of controllers.

This allows achieving a distributed control of the entire system by a plurality of controllers by reusing distributed-control applications based on a conventional communication architecture such as TCP/IP, making it easy to establish a large-scale system.

It should the above-mentioned respective embodiments can be carried out by combining them.

<Examples of Hardware Configuration>

Examples of hardware devices which may be used in the communications system according the present invention is described below.

Examples of devices which may be used as the controllers include a computer such as PC (personal computer), an appliance, a thin client server, a workstation, a main frame, a super computer. Note that the controllers may be a relaying device or a peripheral device, not limited to a terminal device or a server. Also, an expansion board installed in a computer or the like may be used as the controller, or a virtual machine (VM) established on a physical machine may be used as the controller.

Examples of devices which may be used as the node devices include a network switch, a router, a proxy, a gateway, a firewall, a load balancer, a packet shaper, a SCADA (supervisory control and data acquisition) security monitoring controller, a gatekeeper, a base station, an access point (AP), a communication satellite (CS), and a computer having a plurality of communication ports. Also, a virtual switch operating on a virtual machine (VM) established on a physical machine may be used as the node device. The controllers and the node devices may be installed on movable bodies such as vehicles, ships and airplanes.

Figure 12:
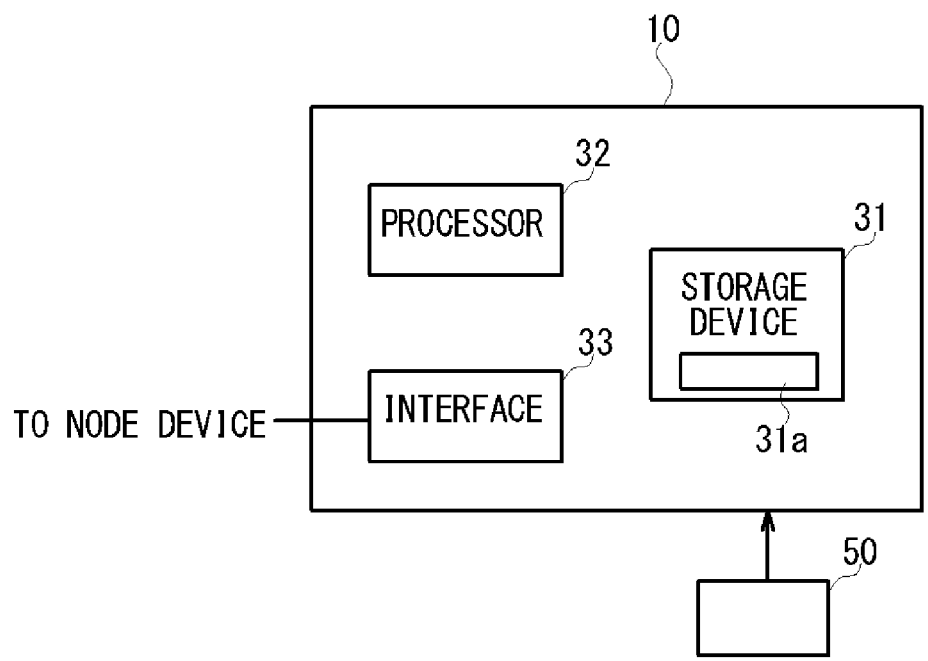
FIG. 12 shows an exemplary hardware configuration of a controller according to the present invention.

In one example, as shown in FIG. 12, each controller 10 may each include a storage device (or memory) 31, a processor 32, and an interface 33. The storage device 31 stores a software program 31a which includes codes describing the above-described operations of the controller 10. The storage device 31 is also used to store various data used and generated in the operations of the controller 10. The processor 32 executes the software program 31a to perform the above-described operations of the controller 10. The interface 33 is used to communicate with the node devices 20. A non-transitory recording medium 50 may be used to install the software program 31a onto the storage device 31.

Figure 13:
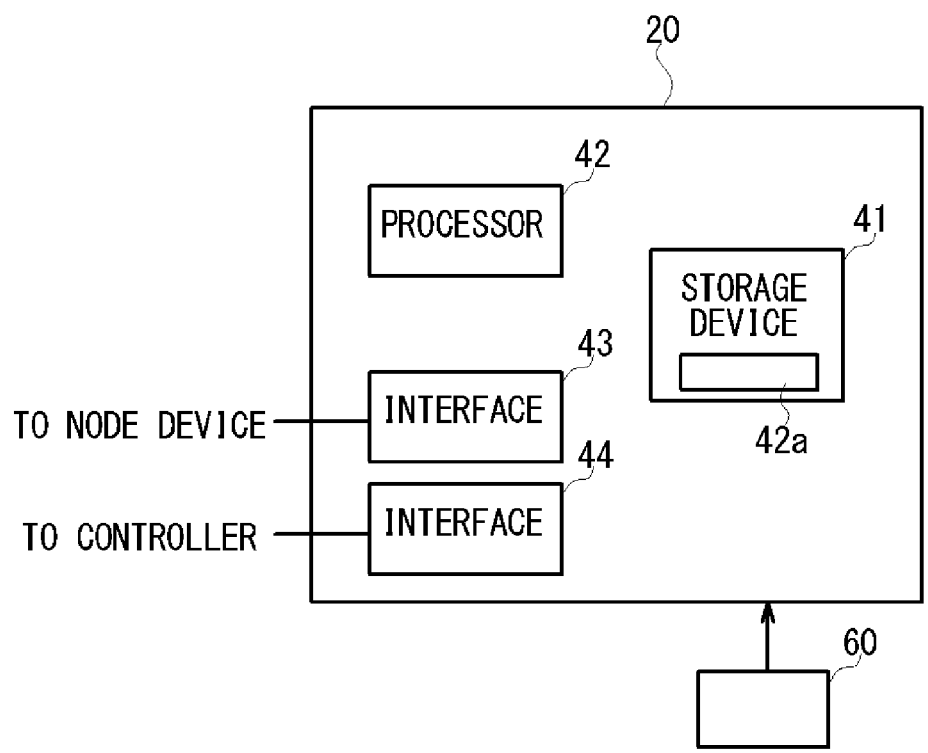
FIG. 13 shows an exemplary hardware configuration of a node device according to the present invention.

Similarly, as shown in FIG. 13, each node device 20 may each include a storage device (or memory) 41, a processor 42, and interfaces 43 and 44. The storage device 41 stores a software program 41a which includes codes describing the above-described operations of the node device 20. The storage device 41 is also used to store various data used and generated in the operations of the node device 20. The processor 32 executes the software program 41a to perform the above-described operations of the node device 10. The interface 43 is used to communicate with another node device 20, and interface 44 is used to communicate with a controller 10. A non-transitory recording medium 60 may be used to install the software program 41a onto the storage device 41.

Examples of the processors 32 and 42 include a CPU (central processing unit), a network processor (NP), a microprocessor, a microcontroller, and a large scale integrated circuit (LSI) having a dedicated function and the like.

Examples of the storage devices (or memories) 31 and 41 include a semiconductor storage device such as a RAM (Random Access Memory), a ROM (Read Only Memory), an EEPROM (Electrically Erasable and Programmable Read Only Memory), a flash memory, an auxiliary storage device such as an HDD (Hard Disk Drive), an SSD (Solid State Drive), a removable disk such as a DVD (Digital Versatile Disk), a storage medium such as an SD memory card (Secure Digital memory card), and the like. Also, a buffer, a register and the like may be used as the storage devices (or memories) 31 and 41. In one embodiment, a storage device that uses a DAS (direct attached storage), an FC-SAN (fiber channel—storage area network), an NAS (network attached storage), IP-SAN (IP—storage area network) and the like may be used the storage devices (or memories) 31 and 41.

The processor 31 and the storage device 32 may be monolithically integrated and the processor 41 and the storage device 42 may be monolithically integrated. In recent years, one-chip microcomputers have been made popular. In one embodiment, a one-chip microcomputer installed in an electronic appliance or the like may monolithically integrate the above-described processor and storage device.

Examples of the above-described interface includes a circuit board (a mother board, an I/O board) and a semiconductor integrated circuit which are adapted to a network communication, a network adaptor such as an NIC (network interface card), a similar expansion card, a communication apparatus such as an antenna, and a communication port such as a connection port (connector).

Also, examples of the network include the Internet, an LAN (local area network), a wireless LAN, a WAN (wide area network), a backbone, a cable television (CATV) line, a fixed telephone network, a mobile telephone network, WiMAX (IEEE 802.16a), a 3G (3rd generation) communication system, a dedicated line (lease line), an IrDA (infrared data association), Bluetooth (Registered Trademark), a serial communication line, a data bus and the like.

Configuration elements included in each of the controllers and the node devices may be modules and components, or dedicated devices, or starting (calling) programs for them.

It should be noted that actual implementations are not limited to these examples.

<Summary>

As discussed above, the communications system in exemplary embodiments of the present invention includes controllers and node devices. The controllers control packet processing in the respective node devices.

The node devices outputs packets from their own physical or logical interfaces under control of the controllers.

Each controller each obtains identifying conditions (identifying rules) of packets used to communicate with a network that is not under control of the controller (that is, a network provided outside its own network).

Also, each controller calculates the transfer route which connects an interface of one node device and another interface of a boundary node device located on the boundary with a different network, which is used for establishing a connection to a device provided outside its own network.

In one embodiment, the controllers may each calculate a transfer route in which a start point is defined as an interface of a node device connected to the controller via a data communication link and an end point is defined as an interface of a boundary node device which is used for establishing a connection to a device provided outside its own network. Alternatively, the controllers may each calculates a transfer route in which a start point is defined as an interface of a boundary node device which is used for establishing a connection to a device provided outside its own network and an end point is defined as an interface of a node device connected to the controller via a data communication link.

Also, the controllers each sets the node devices with processing rules (or flow entries) so that packets complying with the identifying conditions (or the identifying rules) are transferred on the calculated transfer route.

<Supplementary Note>

Some or all of the above-mentioned embodiments may be represented as described in the following supplementary notes. It should be noted that actual implementations are not limited to the following supplementary nodes.

(Supplementary Note 1)

A communications system in which controllers control packet processing in each of node devices, and the node devices each output packets any interfaces thereof under control of a controller connected thereto, wherein each of the controllers includes:

a node communication section which sets a control channel to control each of the node devices and transmits and receives control messages;

a network interface connected to one of node devices via a data communication link;

an adjacency discovery section which discovers a boundary node device from the node devices, the boundary node being located on the boundary with a different network that is controlled by a different controller;

an identifying condition calculating section calculating identifying conditions (or identifying rules) of packets used to communicate with a controller in the network adjacent thereto;

a route calculating section that calculates a transfer route having a start point determined as a node device connected to an interface of the controller, through which a packet is outputted to an interface of the boundary node device, the interface being connected to a different network outside its own network, and a transfer route having a start point determined as the boundary node device, through which a packet is outputted to an interface of the node device connected to the interface of the controller; and a processing rule calculating section that sets the node devices connected to the each controller with processing rules (flow entries) so as to transfer packets complying with the identifying conditions (the identifying rules) on the transfer route.

(Supplementary Note 2)

The communications system set forth in supplementary note 1, wherein the adjacency discovery section embeds unique identification information of each controller into retrieval packets used to retrieve a connection relation among the node devices inside each network.

(Supplementary Note 3]

The communications system set forth in the supplementary note 1, wherein the controller instructs the boundary node device to output a packet which incorporates identifying conditions (identifying rules) from the interface connected to the different network.

(Supplementary Note 4)

The communications system described in the supplementary note 1, wherein the identifying condition calculating section incorporates identifying conditions used in the communication between the controllers into a retrieval packet used to retrieve a connection relation among the node devices inside each network.

(Supplementary Note 5]

The communications system set forth in any one of supplementary notes 1 to 4, wherein the route calculation section refers to identification information incorporated in the retrieval packet transmitted to the controller through an interface by a node device, and, if it is equal to identification information indicative of its own controller, determines the interface of the node device connected to the controller as an end point in the route calculation.

(Supplementary Note 6)

The communications system set forth in any one of supplementary notes 1 to 5, wherein the network interface is physically connected through a network link connection cable.

(Supplementary Note 7)

The communications system set forth in any one of supplementary notes 1 to 5, wherein the controller contains one or more virtual ports for transmitting and receiving packets, a sorting rule storage section storing one or more sorting rules of packets and a sorting section for specifying a sorting destination of packets, wherein the sorting rule storage section retrieves and return selected one of the sorting rules in response to a reference request, and wherein the sorting section specifies a transfer destination of packets transmitted and received between the interface of the boundary node device and the virtual ports, in accordance with the sorting rule selected by referring to the sorting rule storage section.

(Supplementary Note 8)

The communications system set forth in any one of supplementary notes 1 to 5, wherein the communications system includes a plurality of controllers, an interface section in a node device controlled by one of the controllers is connected via a communication line to an interface section in a node device controlled by a different one of the controllers, wherein each of the controllers contains an wide area control section that communicates with a different one of the controllers, wherein the wide area control sections are each connected to one or more of the virtual ports, and wherein the wide area control sections communicate with each other through the virtual ports.

(Supplementary Note 9)

A communicating method in which controllers control packet processing in each of node devices, and the node devices each output packets any interfaces thereof under control of a controller connected thereto, wherein each of the controllers is connected via a network interface which achieves a data transfer link connection to one or more of the node devices, and wherein the communication method includes:

discovering a boundary node device from the node devices, located on a boundary with a different network that is controlled by a different controller;

calculating identifying conditions (or identifying rules) of packets used to communicate with the different controller in the different network;

calculating a transfer route having a start point determined as a node device connected to an interface of the controller, through which a packet is outputted to an interface of the boundary node device, the interface being connected to a different network outside its own network, and a transfer route having a start point determined as the boundary node device, through which a packet is outputted to an interface of the node device connected to the interface of the controller; and setting the node devices connected to the each controller with processing rules (flow entries) so as to transfer packets complying with the identifying conditions (the identifying rules) on the transfer route, and processing a packet complying with the identifying conditions (of the identifying rules) of a processing rule in accordance with the processing rule (flow entry).

(Supplementary Note 10)

The communicating method system described in supplementary note 9, wherein each controller embeds unique identification information of the each controller into retrieval packets used to retrieve a connection relation among the node devices inside each network, wherein the controller refers to identification information incorporated in the retrieval packet, and compares the identification information incorporated in the packet with its own identification information and consequently determines whether the retrieval packet comes from a different controller.

(Supplementary Note 11)

The communicating method set forth in supplementary note 9, wherein the controller instructs the boundary node device to output a packet incorporating identifying conditions (or the identifying rules) from the interface connected to the different network.

(Supplementary Note 12)

The communicating method set forth in supplementary note 9, wherein the controller incorporates packet judgment conditions used in the communication between the controllers into a retrieval packet used to retrieve the connection relation between the node devices in its own network.

(Supplementary Note 13)

The communicating method set forth in any one of supplementary notes 9 to 12, wherein each controller refers to identification information incorporated in the retrieval packet transmitted to the controller through the interface from the node device, and if the identification information is equal to its own identification information, determines the interface of the node device connected to the controller as an end point in the route calculation.

(Supplementary Note 14)

The communicating method described in one of the supplementary notes 9 to 13, wherein the controller is physically connected through a cable for a network link connection to the node device.

(Supplementary Note 15)

A controller for controlling packet processing of node devices, including:

a network interface for establishing a connection to one of the node devices via a data transfer link;

an adjacency discovery section for discovering a boundary node device from the node devices, the boundary node device being located on the boundary with a different network that is controlled by a different controller;

an identifying condition calculating section calculating identifying conditions (or identifying rules) of packets used to communicate with a controller in the network adjacent thereto;

a route calculating section that calculates a transfer route having a start point determined as a node device connected to an interface of the controller, through which a packet is outputted to an interface of the boundary node device, the interface being connected to a different network outside its own network, and a transfer route having a start point determined as the boundary node device, through which a packet is outputted to an interface of the node device connected to the interface of the controller; and a processing rule calculating section that sets the node devices connected to the each controller with processing rules (flow entries) so as to transfer packets complying with the identifying conditions (the identifying rules) on the transfer route.

(Supplementary Note 16)

The controller described in the supplementary note 15, wherein the adjacency discovery section embeds unique identification information of each controller into retrieval packets used to retrieve a connection relation among the node devices inside each network.

(Supplementary Note 17)

The controller described in the supplementary note 15, wherein the identifying condition calculating section of the controller instructs the boundary node device to output a packet which incorporates identifying conditions (identifying rules) from the interface connected to the different network.

(Supplementary Note 18)

The controller described in the supplementary note 15, wherein the identifying condition calculating section incorporates identifying conditions used in the communication between the controllers into a retrieval packet used to retrieve a connection relation among the node devices inside each network.

(Supplementary Note 19)

The controller described in one of the supplementary notes 15 to 18, wherein the route calculation section refers to identification information incorporated in the retrieval packet transmitted to the controller through an interface by a node device, and, if it is equal to identification information indicative of its own controller, determines the interface of the node device connected to the controller as an end point in the route calculation.

(Supplementary Note 20)

The controller described in one of the supplementary notes 15 to 20, wherein the network interface is physically connected through a network link connection cable.

It should be noted that an information processing apparatus may be used as the above-described controller. Also, a communicating apparatus may be used as the above-described node device.

<Remark>

While the invention has been particularly shown and described with reference to exemplary embodiments thereof, the invention is not limited to these examples. It will be understood by those skilled in the art that various changes in form and details any be made therein without departing from the spirit and scope of the present invention as defined by the claims.

This application is based upon claims the benefit of priority from Japanese patent application No. 2012-068286, filed on Mar. 23, 2012, the disclosure of which is incorporated herein in its entirety by reference.

The invention claimed is:

1. A communications system, comprising:

a first node device provided in a first network;

a first controller controlling said first node device;

a second node device provided in a second network and connected to said first node device; and a second controller controlling said second node device, wherein said first controller sets said first node device with a first processing rule according to which packets transferred between said first and second controllers are processed, wherein said second controller sets said second node device with a second processing rule according to which said packets are processed, wherein said first and second controllers exchange said packets with each other through at least said first and second node devices, wherein said first controller stores first sorting rules which correlate virtual ports of said first controller and interfaces of said first node device and sorts inputted packets to any of the virtual ports of said first controller and the interfaces of said first node device in accordance with said first sorting rules, and wherein said second controller stores second sorting rules which correlate virtual ports of said second controller and interfaces of said second node device and sorts inputted packets to any of the virtual ports of said second controller and the interfaces of said second node device in accordance with said second sorting rules.

2. The communications system according to claim 1, wherein said first node device requests said first controller for the first processing rule for performing processing on a packet from said second controller, wherein said first controller determines said first node device as a node device located on a boundary with a different network to the first network based on said request of said first node device, wherein said second node device requests said second controller for the second processing rule for performing processing on a packet from said first controller, and wherein said second controller determines said second node device as a node device located on a boundary with a different network to the second network based on said request of said second node device.

3. The communications system according to claim 2, wherein said first controller determines that said first node device comprises a node device located on a boundary with a network managed by said second controller, based on a packet incorporating an identifier of said second controller and received from said second controller, and wherein said second controller determines that said second node device comprises a node device located on a boundary with a network managed by said first controller, based on a packet incorporating an identifier of said first controller and received from said first controller.

4. The communications system according to claim 2, wherein said first controller transmits a packet for collecting information related to connections of node devices controlled by said first controller and receives from said second controller a packet for said second controller to collect connections of node devices controlled by said second controller, wherein said second controller transmits a packet for collecting information related to connections of node devices controlled by said second controller and receives from said first controller a packet for said first controller to collect connections of node devices controlled by said first controller.

5. The communications system according to claim 1, wherein said first and second controllers exchange information related to packets used for communications between said first and second controllers via at least said first and second node devices.

6. The communications system according to claim 1, wherein said first controller is further connected to said first node device via a first data communication link, wherein said first controller transmits and receives packets to be exchanged between said first and second controllers to and from said first node device via said first data communication link, wherein said second controller is further connected to said second node device via a second data communication link, and wherein said second controller transmits and receives packets to be exchanged between said first and second controllers, to and from said second node device via said second data communication link.

7. The communications system according to claim 1, wherein said first controller transmits and receives packets to be exchanged between said first and second controllers to and from said first node device via a control channel established between said first controller and said first node device, and wherein said second controller transmits and receives packets to be exchanged between said first and second controllers to and from said second node device via a control channel established between said second controller and said second node device.

8. The communications system according to claim 1, wherein said first controller sets said first node device with a third processing rule for transferring to said second node device a packet to be transmitted from said first controller to said second controller, wherein said first node device transfers to said second node device a packet to be transmitted from said first controller to said second controller in accordance with the third processing rule set by said first controller, wherein said second controller sets said second node device with a fourth processing rule for transferring to said first node device a packet to be transmitted from said second controller to said first controller, wherein said second node device transfers to said first node device a packet to be transmitted from said second controller to said first controller in accordance with the fourth processing rule set by said second controller.

9. The communications system according to claim 1, wherein said first controller sets said first node device with a fifth processing rule for transferring to said first controller a packet to be transmitted from said second controller to said first controller, wherein, when a first received packet which said first node device receives from said second node device comprises a packet to be transferred from said second controller to said first controller, said first node device transfers said first received packet to said first controller in accordance with the fifth processing rule set by said first controller, wherein said second controller sets said second node device with a sixth processing rule for transferring to said second controller a packet to be transmitted from said first controller to said second controller, and wherein, when a second received packet which said second node device receives from said first node device comprises a packet to be transferred from said first controller to said second controller, said second node device transfers said second received packet to said second controller in accordance with the sixth processing rule set by said second controller.

10. The communications system according to claim 1, wherein, when a first input packet is inputted from a virtual port of said first controller, said first controller outputs to said first node device said first input packet and an instruction to output said first input packet from an interface of said first node device in accordance with said first sorting rules, wherein, when a second input packet is inputted from an interface of said first node device, said first controller outputs said second input packet to a virtual port of said first controller in accordance with said first sorting rules, wherein, when a third input packet is inputted from a virtual port of said second controller, said second controller outputs to said second node device said third input packet and an instruction to output said third input packet from an interface of said second node device in accordance with said second sorting rules, wherein, when a fourth input packet is inputted from an interface of said second node device, said second controller outputs said fourth input packet to a virtual port of said second controller in accordance with said second sorting rules.

11. A communication method, comprising:

setting, by a first controller, a first node device provided in a first network with a first processing rule according to which packets transferred between said first controller and a second controller are processed;

setting, by the second controller, a second node device provided in a second network with a second processing rule according to which said packets are processed;

establishing a connection between said first and second node devices; and exchanging said packets between the first and second controllers through at least the first and second node devices, wherein said first controller stores first sorting rules which correlate virtual ports of said first controller and interfaces of said first node device and sorts inputted packets to any of the virtual ports of said first controller and the interfaces of said first node device in accordance with said first sorting rules, and wherein said second controller stores second sorting rules which correlate virtual ports of said second controller and interfaces of said second node device and sorts inputted packets to any of the virtual ports of said second controller and the interfaces of said second node device in accordance with said second sorting rules.

12. The communication method according to claim 11, further comprising:

said first node device requesting said first controller for the first processing rule for performing processing on a packet from said second controller;

said first controller determining said first node device as a node device located on a boundary with a different network to the first network based on said request of said first node device, said second node device requesting said second controller for the second processing rule for performing processing on a packet from said first controller; and said second controller determining said second node device as a node device located on a boundary with a different network to the second network based on said request of said second node device.

13. The communication method according to claim 12, further comprising:

said first controller determining that said first node device comprises a node device located on a boundary with a network managed by said second controller, based on a packet incorporating an identifier of said second controller and received from said second controller; and said second controller determining that said second node device comprises a node device located on a boundary with a network managed by said first controller, based on a packet incorporating an identifier of said first controller and received from said first controller.

14. The communication method according to claim 12, further comprising:

said first controller transmitting a packet for collecting information related to connections of node devices controlled by said first controller;

said second controller transmitting a packet for collecting information related to connections of node devices controlled by said second controller;

said first controller receiving from said second controller a packet for said second controller to collect connections of node devices controlled by said second controller; and said second controller receiving from said first controller a packet for said first controller to collect connections of node devices controlled by said first controller.

15. The communication method according to claim 11, wherein said first and second controllers exchange information related to packets used for communications between said first and second controllers via at least said first and second node devices.

16. The communication method according to claim 11, wherein said first controller is further connected to said first node device via a first data communication link, wherein said second controller is further connected to said second node device via a second data communication link, and wherein said method further comprises:

said first controller transmitting and receiving packets to be exchanged between said first and second controllers to and from said first node device via said first data communication link, and said second controller transmitting and receiving packets to be exchanged between said first and second controllers, to and from said second node device via said second data communication link.

17. The communication method according to claim 11, further comprising:

said first controller transmitting and receiving packets to be exchanged between said first and second controllers to and from said first node device via a control channel established between said first controller and said first node device; and said second controller transmitting and receiving packets to be exchanged between said first and second controllers to and from said second node device via a control channel established between said second controller and said second node device.

18. The communication method according to claim 11, further comprising:

said first controller setting said first node device with a third processing rule for transferring a packet to be transmitted from said first controller to said second controller;

said first node device transferring to said second node device a packet to be transmitted from said first controller to said second controller in accordance with the third processing rule set by said first controller, said second controller setting said second node device with a fourth processing rule for transferring a packet to be transmitted from said second controller to said first controller; and said second node device transferring to said first node device a packet to be transmitted from said second controller to said first controller in accordance with the fourth processing rule set by said second controller.

19. The communication method according to claim 11, further comprising:

said first controller setting said first node device with a fifth processing rule for transferring to said first controller a packet to be transmitted from said second controller to said first controller;

when a first received packet which said first node device receives from said second node device comprises a packet to be transferred from said second controller to said first controller, transferring said first received packet to said first controller by said first node device in accordance with the fifth processing rule set by said first controller, said second controller setting said second node device with a sixth processing rule for transferring to said second controller a packet to be transmitted from said first controller to said second controller; and when a second received packet which said second node device receives from said first node device comprises a packet to be transferred from said first controller to said second controller, transferring said second received packet to said second controller by said second node device in accordance with the sixth processing rule set by said second controller.

20. The communication method according to claim 11, further comprising:

when a first input packet is inputted from a virtual port of said first controller, outputting to said first node device said first input packet and an instruction to output said first input packet from an interface of said first node device in accordance with said first sorting rules by said first controller;

when a second input packet is inputted from an interface of said first node device, outputting said second input packet to a virtual port of said first controller in accordance with said first sorting rules by said first controller;

when a third input packet is inputted from a virtual port of said second controller, outputting to said second node device said third input packet and an instruction to output said third input packet from an interface of said second node device in accordance with said second sorting rules by said second controller; and when a fourth input packet is inputted from an interface of said second node device, outputting said fourth input packet to a virtual port of said second controller in accordance with said second sorting rules by said second controller.

21. A non-transitory recording medium storing a program which when executed causes an information processing apparatus to perform steps of:

controlling a first node device provided in a first network by setting said first node device with a first processing rule according to which packets transferred between said information processing apparatus and another information processing apparatus are processed, the other information processing apparatus controlling a second node device provided in a second network; and exchanging said packets between the first and second controllers through at least the first and second node devices, wherein said first controller stores first sorting rules which correlate virtual ports of said first controller and interfaces of said first node device and sorts inputted packets to any of the virtual ports of said first controller and the interfaces of said first node device in accordance with said first sorting rules, and wherein said second controller stores second sorting rules which correlate virtual ports of said second controller and interfaces of said second node device and sorts inputted packets to any of the virtual ports of said second controller and the interfaces of said second node device in accordance with said second sorting rules.

22. A non-transitory recording medium storing a program which when executed causes a communication apparatus provided in a first network to perform steps of:

setting, by a first controller, a processing rule according to which packets transferred between said first controller and a second controller controlling a different communication apparatus are processed, the different communication apparatus provided in a second network;

establishing a connection with said different communication apparatus;

transmitting a packet received from said second controller to said first controller in accordance with said processing rule, and transmitting a packet received from said first controller to said different communication apparatus in accordance with said processing rule, wherein said first controller stores first sorting rules which correlate virtual ports of said first controller and interfaces of a first node device and sorts inputted packets to any of the virtual ports of said first controller and the interfaces of said first node device in accordance with said first sorting rules, and wherein said second controller stores second sorting rules which correlate virtual ports of said second controller and interfaces of a second node device and sorts inputted packets to any of the virtual ports of said second controller and the interfaces of said second node device in accordance with said second sorting rules.

23. A first controller for controlling packet processing of node devices, comprising:

a network interface for establishing a connection to a first node device in a first network; and a processor programmed to:

control said first node device by setting said first node device with a processing rule according to which packets transferred between said first controller and a second controller are processed, the second controller controlling a second node device provided in a second network; and exchanging said packets between said first controller and said second controller through at least the first and second node devices, wherein said first controller stores first sorting rules which correlate virtual ports of said first controller and interfaces of said first node device and sorts inputted packets to any of the virtual ports of said first controller and the interfaces of said first node device in accordance with said first sorting rules.

24. A first node device in a first network, comprising:
a network interface for establishing connection with a first controller; and
a communication unit programed to:
set a processing rule according to which packets transferred between said first controller and a second controller are processed, the second controller controlling a second node device provided in a second network;
establish a connection with said second node device;
transmit a packet received from said second controller to said first controller in accordance with said processing rule; and
to transmit a packet received from said first controller to said second node device in accordance with said processing rule,
wherein the first node device includes a plurality of interfaces, the plurality of interfaces are correlated to a plurality of virtual ports of the first controller in accordance with a first sorting rule, and inputted packets are sorted to any of the plurality of virtual ports of the first controller and the plurality of interfaces of the first node device in accordance with the first sorting rule, and
wherein the second node device includes a plurality of interfaces, the plurality of interfaces are correlated to a plurality of virtual ports of the second controller in accordance with a second sorting rule, and inputted packets are sorted to any of the plurality of virtual ports of the second controller and the plurality of interfaces of the second node device in accordance with the second sorting rule.

25. A first controller for controlling packet processing of node devices, comprising:
a network interface for establishing a connection to a first node device in a first network; and
a processor programmed to:
control said first node device by setting said first node device with a processing rule according to which packets transferred between said first controller and a second controller are processed, the second controller controlling a second node device provided in a second network;
exchange said packets between said first controller and said second controller through at least the first and second node devices,
determine the first node device as a node device located on a boundary with a different network to the first network based on said request of said first node device, and
determine that the first node device comprises a node device located on a boundary with a network managed by said second controller, based on a packet incorporating an identifier of the second controller that is received from the second controller.

26. A first controller for controlling packet processing of node devices, comprising:
a network interface for establishing a connection to a first node device in a first network; and
a processor programmed to:
control said first node device by setting said first node device with a processing rule according to which packets transferred between said first controller and a second controller are processed, the second controller controlling a second node device provided in a second network;
exchange said packets between said first controller and said second controller through at least the first and second node devices,
determine the first node device as a node device located on a boundary with a different network to the first network based on said request of said first node device,
transmit a packet for collecting information related to connections of node devices controlled by the first controller, and
receive from the second controller a packet for the second controller to collect connections of node devices controlled by the second controller.

27. A first controller for controlling packet processing of node devices, comprising:
a network interface for establishing a connection to a first node device in a first network; and
a processor programmed to:
control said first node device by setting said first node device with a processing rule according to which packets transferred between said first controller and a second controller are processed, the second controller controlling a second node device provided in a second network;
exchange said packets between said first controller and said second controller through at least the first and second node devices, and
set the first node device with a third processing rule for transferring to the first controller a packet to be transmitted from the second controller to said first controller,
wherein, when a first received packet which the first node device receives from the second node device comprises a packet to be transferred from the second controller to the first controller, the first node device transfers the first received packet to the first controller in accordance with the third processing rule.

28. A first controller for controlling packet processing of node devices, comprising:
a network interface for establishing a connection to a first node device in a first network; and
a processor programmed to:
control said first node device by setting said first node device with a processing rule according to which packets transferred between said first controller and a second controller are processed, the second controller controlling a second node device provided in a second network;
exchange said packets between said first controller and said second controller through at least the first and second node devices, and
store first sorting rules which correlate virtual ports of said first controller and interfaces of said first node device and sorts inputted packets to any of the virtual ports of said first controller and the interfaces of said first node device in accordance with said first sorting rules,
wherein, when a first input packet is inputted from a virtual port of said first controller, said first controller outputs to said first node device said first input packet and an instruction to output said first input packet from an interface of said first node device in accordance with said first sorting rules.

* * * * *